United States Patent
Lee et al.

(10) Patent No.: US 11,354,294 B2
(45) Date of Patent: *Jun. 7, 2022

(54) SYSTEM AND METHOD FOR UPDATING KNOWLEDGE GRAPH

(71) Applicant: SAMSUNG ELECTRONICS CO., LTD., Suwon-si (KR)

(72) Inventors: Hyonsok Lee, Suwon-si (KR); Mirae Jeong, Suwon-si (KR); Jiyoung Kang, Suwon-si (KR); Kyunghwan Lee, Suwon-si (KR); Jeonghyeon Lee, Suwon-si (KR); Junhyuk Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/028,542

(22) Filed: Sep. 22, 2020

(65) Prior Publication Data

US 2021/0117402 A1 Apr. 22, 2021

(30) Foreign Application Priority Data

Oct. 17, 2019 (KR) .................. 10-2019-0129328

(51) Int. Cl.
*G06F 16/23* (2019.01)
*G06F 16/901* (2019.01)

(52) U.S. Cl.
CPC .......... *G06F 16/23* (2019.01); *G06F 16/9024* (2019.01)

(58) Field of Classification Search
CPC ...... G06F 16/9023; G06F 16/23; G06F 16/25; G06F 16/9024; G06F 16/288

USPC ........................................................ 707/798
See application file for complete search history.

(56) References Cited

U.S. PATENT DOCUMENTS

| 8,532,610 B2 | 9/2013 | Manning Cassett et al. |
| 10,679,133 B1* | 6/2020 | Mathur .................. G06N 5/046 |
| 2015/0254372 A1* | 9/2015 | Hua ........................ G06F 16/23 |
| | | 707/798 |

(Continued)

FOREIGN PATENT DOCUMENTS

| KR | 10-0949620 B1 | 3/2010 |
| KR | 10-2015-0084706 A | 7/2015 |
| WO | 2018/156184 A1 | 8/2018 |

OTHER PUBLICATIONS

International Search Report (PCT/ISA/210) and Written Opinion (PCT/ISA/237) issued by the International Searching Authority in International Application No. PCT/KR2020/012246, dated Dec. 10, 2020.

*Primary Examiner* — Robert W Beausoliel, Jr.
*Assistant Examiner* — Pedro J Santos
(74) *Attorney, Agent, or Firm* — Sughrue Mion, PLLC

(57) ABSTRACT

A method of updating a server knowledge graph, is performed by a server and includes obtaining a server knowledge graph of the server, and obtaining a plurality of device knowledge graphs by receiving a device knowledge graph from each of a plurality of devices. The method further includes generating a knowledge graph for server knowledge graph extension, based on the obtained plurality of device knowledge graphs, and updating the obtained server knowledge graph, using the generated knowledge graph for server knowledge graph extension.

20 Claims, 23 Drawing Sheets

(56) References Cited

U.S. PATENT DOCUMENTS

| | | | |
|---|---|---|---|
| 2016/0103932 A1* | 4/2016 | Sathish | G06F 3/04847 715/767 |
| 2017/0076206 A1* | 3/2017 | Lastras-Montano | G06F 16/9024 |
| 2017/0132329 A1* | 5/2017 | Yakout | G06F 16/9024 |
| 2018/0039696 A1* | 2/2018 | Zhai | G06F 16/35 |
| 2018/0082183 A1 | 3/2018 | Hertz et al. | |
| 2019/0012405 A1 | 1/2019 | Contractor et al. | |
| 2019/0080245 A1 | 3/2019 | Hickman et al. | |
| 2020/0097615 A1* | 3/2020 | Song | G06F 16/215 |
| 2020/0118010 A1* | 4/2020 | Lee | G06N 5/025 |
| 2020/0285657 A1* | 9/2020 | Ravizza | G06F 16/285 |
| 2021/0089598 A1* | 3/2021 | Jeong | G06F 16/9035 |

* cited by examiner

| Name | John Smith | | Name | Johan Smith | Similarity | Name | 0.8 |
|---|---|---|---|---|---|---|---|
| Profession | Software Eng. | | Profession | Software Dev Eng. | ⇒ | Profession | 0.7 |
| Address | Seattle | | Address | Seattle | | Address | 1.0 |

SYSTEM AND METHOD FOR UPDATING KNOWLEDGE GRAPH

CROSS-REFERENCE TO RELATED APPLICATION

This application is based on and claims priority under 35 U.S.C. § 119 to Korean Patent Application No. 10-2019-0129328, filed on Oct. 17, 2019, in the Korean Intellectual Property Office, the disclosure of which is incorporated by reference herein in its entirety.

BACKGROUND

1. Field

The disclosure relates to a system and method for updating a knowledge graph, and more particularly, to a system and method for updating a server knowledge graph or a device knowledge graph.

2. Description of Related Art

Due to the development of networks and information processing technology, various types of information may be collected and used to provide various services to users. A server for providing services utilizes knowledge graphs related to various categories to provide an appropriate service to a user. However, information preferred by the user frequently changes according to situations, and the server may not easily provide a service desired by the user, considering the change.

As such, a technology for effectively updating a knowledge graph used to provide a service and a technology for reducing delay caused by processing information to provide a service to a user are being developed.

SUMMARY

Provided are a system and method for updating a server knowledge graph by using a device knowledge graph generated by a device.

Provided are a system and method for extending a server knowledge graph by using a device knowledge graph related to operations executed in a device.

Provided are a system and method for reflecting information on operations executed in a device and situations related thereto, on a server knowledge graph.

Provided are a system and method for allowing a device to utilize an updated server knowledge graph.

Additional aspects will be set forth in part in the description that follows and, in part, will be apparent from the description, or may be learned by practice of the presented embodiments of the disclosure.

In accordance with an aspect of the disclosure, a method of updating a server knowledge graph, is performed by a server and includes obtaining a server knowledge graph of the server, and obtaining a plurality of device knowledge graphs by receiving a device knowledge graph from each of a plurality of devices. The method further includes generating a knowledge graph for server knowledge graph extension, based on the obtained plurality of device knowledge graphs, and updating the obtained server knowledge graph, using the generated knowledge graph for server knowledge graph extension.

The generating of the knowledge graph for server knowledge graph extension may include comparing nodes and edges in the obtained plurality of device knowledge graphs, selecting some of the nodes and edges in the plurality of device knowledge graphs, based on the compared nodes and edges, and generating the knowledge graph for server knowledge graph extension by connecting the selected some of the nodes and edges.

The selecting of the some of the nodes and edges in the plurality of device knowledge graphs may include selecting repeated nodes and edges from the compared nodes and edges in the plurality of device knowledge graphs.

The selecting of the some of the nodes and edges in the plurality of device knowledge graphs may include selecting the repeated nodes and edges from the compared nodes and edges in the plurality of device knowledge graphs, based on weights for the plurality of devices.

The device knowledge graph may be generated by each of the plurality of devices, based on log information related to a device operation history that is collected by a respective one of the plurality of devices, and the device knowledge graph may include information of operations that are executed in the respective one of the plurality of devices, and of situations when the operations are executed.

Values corresponding to nodes and edges in the device knowledge graph may be abstracted to represent a series of operations that are repeatedly executed in the respective one of the plurality of devices for a number of times greater than or equal to a threshold.

The knowledge graph for server knowledge graph extension may represent a series of operations that are executed in the plurality of devices.

The updating of the obtained server knowledge graph may include extending the obtained server knowledge graph by connecting any one or any combination of first nodes in the generated knowledge graph for server knowledge graph extension to any one or any combination of second nodes in the obtained server knowledge graph.

The method may further include determining the any one or any combination of the first nodes connected to the any one or any combination of the second nodes, based on any one or any combination of similarities of names of the first nodes and the second nodes, similarities of instances related to the first nodes and the second nodes, and similarities of structures of knowledge graphs.

The method may further include providing the generated knowledge graph for server knowledge graph extension to a device other than the plurality of devices. The provided knowledge graph for server knowledge graph extension may be used by the other device to update a device knowledge graph of the other device.

The method may further include providing the updated server knowledge graph to any one or any combination of the plurality of devices. The provided server knowledge graph may be used by the any one or any combination of the plurality of devices to update the device knowledge graph of the any one or any combination of the plurality of devices.

In accordance with an aspect of the disclosure, a server for updating a server knowledge graph, includes a storage storing at least one instruction, and a processor configured to execute the at least one instruction to obtain a server knowledge graph of the server, obtain a plurality of device knowledge graphs by receiving a device knowledge graph from each of a plurality of devices, generate a knowledge graph for server knowledge graph extension, based on the obtained plurality of device knowledge graphs, and update the obtained server knowledge graph, using the generated knowledge graph for server knowledge graph extension.

The processor may be further configured to execute the at least one instruction to compare nodes and edges in the obtained plurality of device knowledge graphs, select some of the nodes and edges in the plurality of device knowledge graphs, based on the compared nodes and edges, and generate the knowledge graph for server knowledge graph extension by connecting the selected some of the nodes and edges.

The processor may be further configured to execute the at least one instruction to select repeated nodes and edges from the compared nodes and edges in the plurality of device knowledge graphs.

The processor may be further configured to execute the at least one instruction to select the repeated nodes and edges from the compared nodes and edges in the plurality of device knowledge graphs, based on weights for the plurality of devices.

The device knowledge graph may be generated by each of the plurality of devices, based on log information related to a device operation history that is collected by a respective one of the plurality of devices, and the device knowledge graph may include information of operations that are executed in the respective one of the plurality of devices, and of situations when the operations are executed.

Values corresponding to nodes and edges in the device knowledge graph may be abstracted to represent a series of operations that are repeatedly executed in the respective one of the plurality of devices for a number of times greater than or equal to a threshold.

The knowledge graph for server knowledge graph extension may represent a series of operations that are executed in the plurality of devices.

The processor may be further configured to execute the at least one instruction to extend the obtained server knowledge graph by connecting any one or any combination of first nodes in the generated knowledge graph for server knowledge graph extension to any one or any combination of second nodes in the obtained server knowledge graph.

The processor may be further configured to execute the at least one instruction to provide the generated knowledge graph for server knowledge graph extension to a device other than the plurality of devices, and the provided knowledge graph for server knowledge graph extension may be used by the other device to update a device knowledge graph of the other device.

In accordance with an aspect of the disclosure, a non-transitory computer-readable storage medium stores instructions that, when executed by at least one processor, cause the at least one processor to obtain a first device knowledge graph from a first device, a second device knowledge graph from a second device, and a third device knowledge graph from a third device, identify one or more nodes and one or more links between the one or more nodes that are repeated in each of the obtained first device knowledge graph, second device knowledge graph and third device knowledge graph, obtain a knowledge graph for server knowledge graph extension including the identified one or more nodes and one or more links, and connect the one or more nodes included in the obtained knowledge graph for server knowledge graph extension, to one or more nodes included in a server knowledge graph of a server that correspond to the one or more nodes included in the obtained knowledge graph for server knowledge graph extension.

The stored instructions, when executed by the at least one processor, may further cause the at least one processor to obtain a fourth device knowledge graph from a fourth device, provide, to the obtained fourth device knowledge graph, a weight higher than weights of the obtained first device knowledge graph, second device knowledge graph and third device knowledge graph, and obtain the knowledge graph for server knowledge graph extension including the identified one or more nodes and one or more links and one or more nodes and one or more links that are included in the fourth device knowledge graph to which the higher weight is provided.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
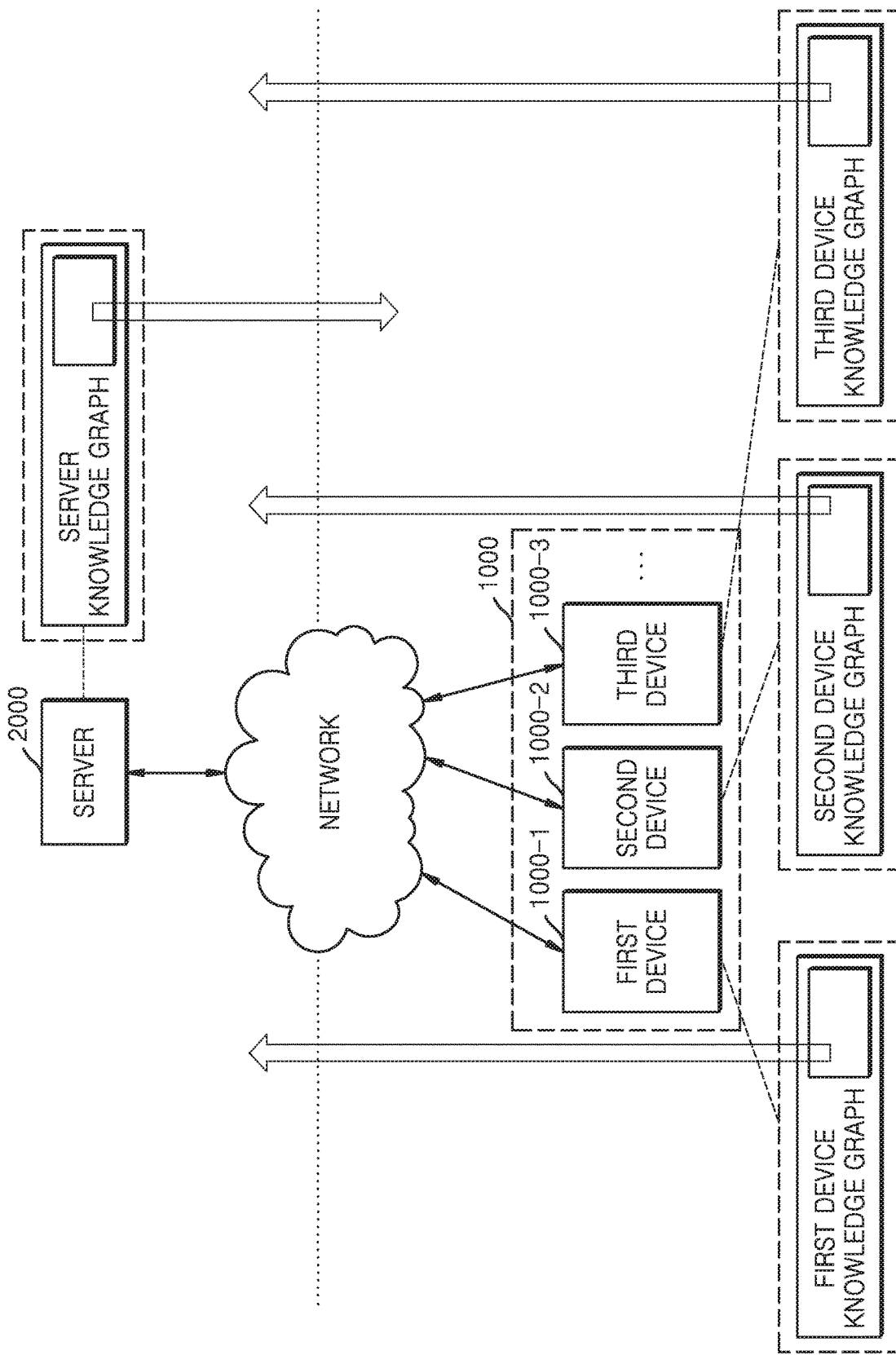
FIG. 1 is a schematic diagram of a system for extending a knowledge graph used for a service, according to an embodiment.

Hereinafter, the disclosure will be described in detail by explaining embodiments of the disclosure with reference to the attached drawings. The disclosure may, however, be embodied in many different forms and may not be construed as being limited to the embodiments of the disclosure set forth herein. In the drawings, parts not related to the disclosure are not illustrated for clarity of explanation, and like reference numerals denote like elements throughout.

Throughout the disclosure, the expression "at least one of a, b or c" indicates only a, only b, only c, both a and b, both a and c, both b and c, all of a, b, and c, or variations thereof.

It will be understood that when an element is referred to as being "connected to" another element, it may be "directly connected to" the other element or be "electrically connected to" the other element through an intervening element. It will be further understood that the terms "includes" and/or "including", when used herein, specify the presence of stated elements, but do not preclude the presence or addition of one or more other elements, unless the context clearly indicates otherwise.

Reference will now be made in detail to embodiments of the disclosure, examples of which are illustrated in the accompanying drawings.

FIG. 1 is a schematic diagram of a system for extending a knowledge graph used for a service, according to an embodiment.

Referring to FIG. 1, the system for updating the knowledge graph used for the service may include a server 2000 and at least one device 1000.

In the system for updating the knowledge graph used for the service, the server 2000 may provide at least a part of a server knowledge graph to the device 1000, and the device 1000 may provide at least a part of a device knowledge graph to the server 2000.

The server 2000 may obtain and manage the server knowledge graph, and update the server knowledge graph by using the device knowledge graph received from the device 1000. The server 2000 may receive at least parts of a plurality of device knowledge graphs from a plurality of devices 1000, and update the server knowledge graph by using the received at least parts of the plurality of device knowledge graphs. The server 2000 may obtain, based on the received plurality of device knowledge graphs, a knowledge graph for server knowledge graph extension, and reflect the knowledge graph for server knowledge graph extension on the server knowledge graph.

The server 2000 may collect, store, and analyze much data to continuously update knowledge in the server knowledge graph and, according to an embodiment, the server 2000 may update the server knowledge graph by utilizing device knowledge graphs generated by a plurality of devices 1000. As such, the server 2000 may reflect more detailed knowledge on the server knowledge graph by saving resources of the server 2000.

The device 1000 may receive at least a part of the server knowledge graph from the server 2000, and generate and update the device knowledge graph by using at least a part of the server knowledge graph received from the server 2000. The device 1000 may receive at least a part of the extended server knowledge graph from the server 2000, and extend the device knowledge graph by using at least a part of the extended server knowledge graph received from the server 2000.

The server 2000 and the device 1000 may more efficiently manage knowledge graphs by sharing parts of the server knowledge graph and the device knowledge graph.

A network is a comprehensive data communication network capable of enabling seamless communication between network entities illustrated in FIG. 1, and may be implemented as a wired communication network such as a local area network (LAN), a wide area network (WAN), or a value added network (VAN), or as every type of a wireless communication network such as a mobile radio communication network or a satellite communication network.

The device 1000 may be a smartphone, a tablet personal computer (PC), a PC, a smart television (TV), a mobile phone, personal digital assistant (PDA), a laptop computer, a media player, a microserver, a global positioning system (GPS) device, an e-book reader, a digital broadcast receiver, a navigation system, a kiosk, an MP3 player, a digital camera, a home appliance, or another mobile or non-mobile computing device, but is not limited thereto. The device 1000 may be a wearable device, e.g., a watch, glasses, a hair band, or a ring, which has a communication function and a data processing function. However, the device 1000 is not limited thereto and may include all types of devices capable of receiving and using a knowledge graph from the server 2000 through the network.

Figure 2:
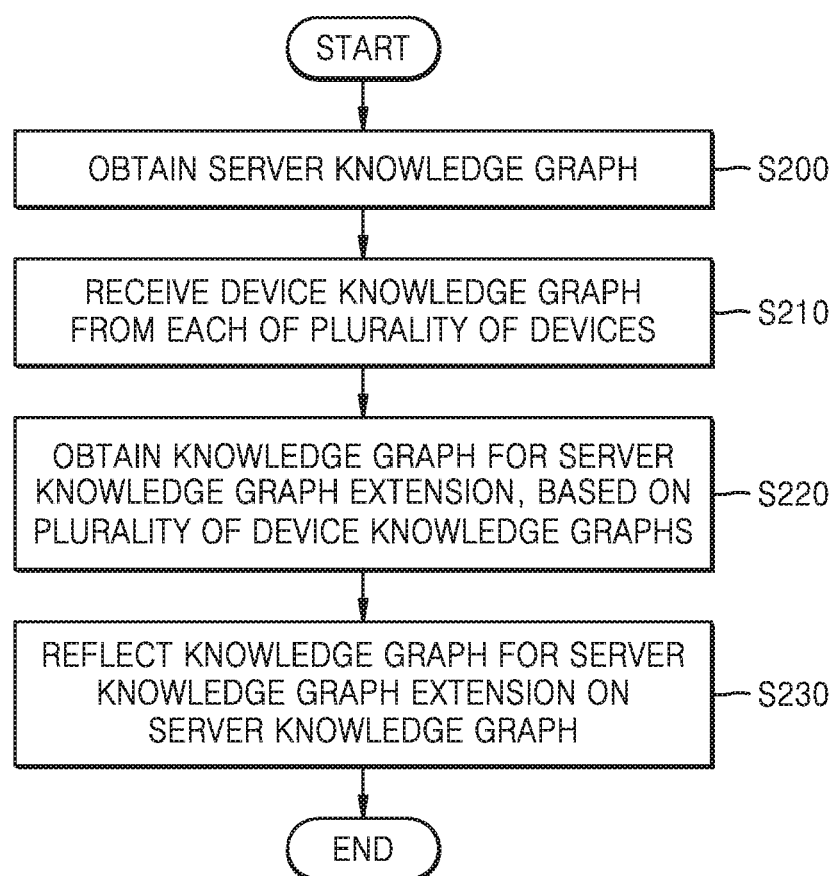
FIG. 2 is a flowchart of a method, performed by a server, of updating a server knowledge graph, according to an embodiment.

FIG. 2 is a flowchart of a method, performed by the server 2000, of updating a server knowledge graph, according to an embodiment.

In operation S200, the server 2000 may obtain the server knowledge graph. The server knowledge graph is a knowledge-based ontology graph used and managed by the server 2000, and may be a graph generated based on properties of concepts. A knowledge graph is an ontology graph structurally representing concepts, and relationships between the concepts. The knowledge graph may be generated by hierarchically expressing concepts and the relations between the concepts, and have a triple structure in which nodes corresponding to the concepts are connected through edges representing the relationships.

The concepts corresponding to the nodes may include, for example, classes and instances, and the relationships corresponding to the edges may include, for example, relations and properties. The classes may refer to objects named in the real world. For example, "keyboard", "monitor", and "love"

may be classes. The instances may refer to concretized concepts of the classes, and be expressed in practical forms such as objects, concrete forms of concepts, or events. For example, "Samsung SyncMaster Wide LCD Monitor" and "Love of Romeo and Juliet" may be instances. Definitions of the classes and the instances may vary depending on purposes of application and use. The same concept may serve as a class in some cases and serve as an instance in other cases. The properties connect classes or instances to values to represent attributes or tendencies of the classes or instances. For example, a property such as "hasSize" may be defined to express that "Samsung SyncMaster Wide LCD Monitor is XX inches". The relations may refer to relations between the classes and the instances, and be divided into taxonomic relations and non-taxonomic relations. The taxonomic relations are relations for hierarchically expressing and classifying the concepts into broad concepts and detailed concepts. A language for expressing the ontology of the knowledge graph may include, for example, Resource Description Framework (RDF), RDF Schema (RDF-S), or Ontology Web Language (OWL), but is not limited thereto. For information in the knowledge graph, for example, subject-predicate-object relations may be expressed in the form of a node-edge-node graph.

The server 2000 may generate the server knowledge graph. The server 2000 may generate the server knowledge graph, based on meanings and properties of concepts. The server 2000 may collect raw data on various concepts, determine concepts, based on the collected raw data, and identify meanings, properties, and relations of the concepts. The server 2000 may generate the server knowledge graph by connecting nodes corresponding to the concepts, based on the meanings, properties, and relations of the concepts. The server 2000 may extend the server knowledge graph by adding nodes and edges to the generated server knowledge graph, or modify the nodes and edges in the generated server knowledge graph. The server 2000 may extend the server knowledge graph by connecting another knowledge graph to the generated server knowledge graph.

The server 2000 may receive the server knowledge graph from another server. In this case, the other server may be a separate server for generating and managing a knowledge graph. The server knowledge graph received from the other server may include, for example, a knowledge graph for a search service or a knowledge graph including dictionary information for a question/answer service, but is not limited thereto. The server 2000 may extend the server knowledge graph by connecting a knowledge graph generated by the server 2000 or another server knowledge graph received from the other server, to the server knowledge graph received from the other server. The server 2000 may receive server knowledge graphs by category, and connect the server knowledge graphs received by category.

The server knowledge graphs by category may include, for example, a server knowledge graph for a chat service, a server knowledge graph for a search service, a server knowledge graph for a recommendation service, and a server knowledge graph for determining 115, but are not limited thereto. A category of the server knowledge graph may be determined based on, for example, the type of a service for which the server knowledge graph is used, or the purpose of using information in the server knowledge graph, but is not limited thereto.

The server knowledge graph may be used to provide a service to a user. The service may include, for example, a broadcasting service, a content sharing service, a content providing service, a power management service, a game providing service, a chat service, a word processing service, a search service, a dictionary information providing service, a call service, an imaging service, a transportation recommendation service, or a video playback service, but is not limited thereto.

In operation S210, the server 2000 may receive a device knowledge graph from each of a plurality of devices 1000. The device knowledge graph is a knowledge-based ontology graph used and managed by a device, and may be a graph generated based on operations executed in the device. The device knowledge graph may have a triple structure in which nodes corresponding to concepts are connected through edges representing relationships.

The device knowledge graph may be generated by the device 1000, based on various operations executed in the device 1000. The device knowledge graph may include nodes and edges representing sequential operations executed in the device 1000. The nodes and edges in the device knowledge graph may be defined based on a series of time-series operations executed in the device 1000. The nodes and edges for representing the operations executed in the device 1000 may be determined based on context information related to the operations executed in the device 1000. The context information related to the operations executed in the device 1000 may include, for example, information on functions executed in the device 1000, contents executed by the device 1000, a status of the device 1000, and an ambient environment of the device 1000. The context information related to the operations executed in the device 1000 may include, for example, any one or any combination of ambient environment information of the device 1000, status information of the device 1000, status information of a user of the device 1000, device usage history information of the user, or schedule information of the user, but is not limited thereto. The ambient environment information of the device 1000 is information on an ambient environment of the device 1000, and may include, for example, weather information, temperature information, humidity information, illuminance information, noise information, and sound information, but is not limited thereto. The status information of the device 1000 may include, for example, operating mode information of the device 1000 (e.g., a standby mode, a power saving mode, a sound mode, a vibration mode, a silent mode, a multi-window mode, or an auto-rotate screen mode), location information of the device 1000, time information, communication module activation information (e.g., Wi-Fi ON, Bluetooth OFF, global positioning system (GPS) ON, or near-field communication (NFC) ON), network connection status information of the device 1000, and application information indicating applications executed by the device 1000 (e.g., application identifiers, application types, application usage times, or application usage cycles), but is not limited thereto. The status information of the user is information on motion, a life pattern, etc. of the user, and may include, for example, information indicating whether the user is walking, exercising, driving, or sleeping, and emotion information of the user, but is not limited thereto. The device usage history information of the user is information on the user's history of using the device 1000, and may include, for example, an application execution history, a history of functions executed in an application, a call history of the user, and a message history of the user, but is not limited thereto.

The device 1000 may obtain the context information related to the operations of the device 1000 by collecting raw data on the operations of the device 1000. The device 1000 may determine concepts related to the operations of the device 1000, based on the collected raw data, and find meanings, properties, and relations of the concepts. The device 1000 may generate the device knowledge graph by connecting nodes corresponding to the concepts, based on the meanings, properties, and relations of the concepts. The device 1000 may extend the device knowledge graph by adding nodes and edges to the generated device knowledge graph, or modify the nodes and edges in the generated device knowledge graph. The device 1000 may extend the device knowledge graph by connecting another knowledge graph to the generated or modified device knowledge graph.

The server 2000 may receive, from each device 1000, the device knowledge graph used and managed by the device 1000. For example, the server 2000 may receive, from a first device 1000-1, a first device knowledge graph generated by the first device 1000-1, receive, from a second device 1000-2, a second device knowledge graph generated by the second device 1000-2, and receive, from a third device 1000-3, a third device knowledge graph generated by the third device 1000-3.

In operation S220, the server 2000 may obtain a knowledge graph to be used for server knowledge graph extension, based on a plurality of device knowledge graphs.

The server 2000 may identify nodes and links between the nodes in the plurality of device knowledge graphs, based on the plurality of device knowledge graphs. For example, the server 2000 may identify nodes and links between the nodes, which are repeated a number of times greater than or equal to a threshold, by comparing the plurality of device knowledge graphs with each other. The server 2000 may generate the knowledge graph to be used for server knowledge graph extension, based on the repeated nodes and links. For example, the server 2000 may compare first nodes and first edges in the first device knowledge graph received from the first device 1000-1, second nodes and second edges in the second device knowledge graph received from the second device 1000-2, and third nodes and third edges in the third device knowledge graph received from the third device 1000-3. The server 2000 may select nodes and edges repeated a number of times greater than or equal to the threshold, from among the first nodes, the first edges, the second nodes, the second edges, the third nodes, and the third edges. The server 2000 may generate the knowledge graph for server knowledge graph extension, based on the selected nodes and edges.

The knowledge graph for server knowledge graph extension may be a knowledge graph used by a server to extend a server knowledge graph. When the device knowledge graphs are knowledge graphs generated based on operations of the devices 1000, the knowledge graph for server knowledge graph extension may be configured as a set of knowledge triples including nodes and edges related to the operations executed in the devices 1000.

The server 2000 may generate the knowledge graph to be used for server knowledge graph extension, based on priorities of the devices 1000. In this case, the server 2000 may generate the knowledge graph for server knowledge graph extension by giving a high weight to nodes and edges in the device knowledge graph received from the device 1000 having a high priority.

The method, performed by the server 2000, of generating the knowledge graph for server knowledge graph extension by receiving the device knowledge graphs from the plurality of devices 1000 will be described in detail below with reference to FIGS. 7 and 8.

In operation S230, the server 2000 may reflect the knowledge graph for server knowledge graph extension on the server knowledge graph. The server 2000 may update at least some of nodes, edges, and connection structures thereof in the server knowledge graph, by using the knowledge graph for server knowledge graph extension. The server 2000 may connect at least some of nodes in the knowledge graph for server knowledge graph extension to the server knowledge graph, or modify at least some of the nodes and edges in the server knowledge graph, based on nodes and edges in the knowledge graph for server knowledge graph extension.

The server 2000 may connect any one or any combination of the nodes in the knowledge graph generated in operation S220, to any one or any combination of the nodes in the server knowledge graph. The server 2000 may connect at least a part of the knowledge graph for server knowledge graph extension to the server knowledge graph by analyzing nodes and links between the nodes in the server knowledge graph and nodes and links between the nodes in the knowledge graph for server knowledge graph extension.

The server 2000 may reflect the knowledge graph for server knowledge graph extension on the server knowledge graph, based on similarity between nodes and edges in the server knowledge graph and nodes and edges in the knowledge graph for server knowledge graph extension.

For example, the server 2000 may connect nodes in the knowledge graph for server knowledge graph extension to nodes in the server knowledge graph, based on similarity between concepts in the server knowledge graph and concepts in the knowledge graph for server knowledge graph extension. For example, the server 2000 may connect nodes in the knowledge graph for server knowledge graph extension to nodes in the server knowledge graph, based on similarity between instances in the server knowledge graph and instances in the knowledge graph for server knowledge graph extension. For example, the server 2000 may connect nodes in the knowledge graph for server knowledge graph extension to nodes in the server knowledge graph, based on similarity between a structure of the server knowledge graph and a structure of the knowledge graph for server knowledge graph extension.

The method, performed by the server 2000, of extending the server knowledge graph by using the knowledge graph for server knowledge graph extension will be described in detail below with reference to FIGS. 9 to 15.

Figure 3:
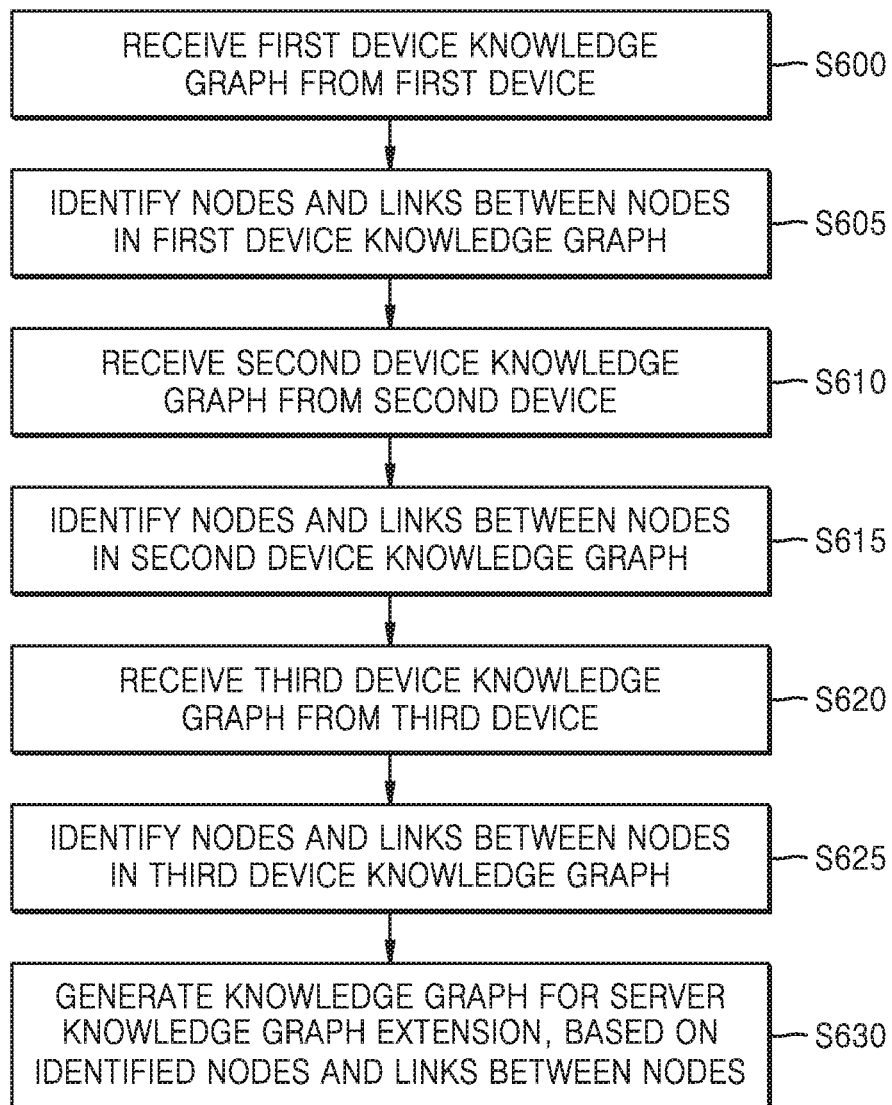
FIG. 3 is a flowchart of a method, performed by a server, of updating a server knowledge graph by using device knowledge graphs, according to an embodiment.

FIG. 3 is a flowchart of a method, performed by the server 2000, of updating a server knowledge graph by using device knowledge graphs, according to an embodiment.

In operation S600, the server 2000 may receive a first device knowledge graph from the first device 1000-1. The server 2000 may request the first device knowledge graph from the first device 1000-1 to update the server knowledge graph, and receive the first device knowledge graph from the first device 1000-1.

The server 2000 may request the first device 1000-1 to provide a knowledge graph related to a category, and the first device 1000-1 may provide a part of the first device knowledge graph related to the requested category, to the server 2000. In this case, the first device 1000-1 may abstract the first device knowledge graph according to a level and provide the abstracted first device knowledge graph to the server 2000. The first device 1000-1 may abstract the first device knowledge graph by abstractly expressing nodes and links between the nodes in the first device knowledge graph.

In a cycle or when an event occurs, the server 2000 may request the first device knowledge graph from the first device 1000-1. Alternatively, when the first device knowledge graph is updated by the first device 1000-1, the server 2000 may receive the first device knowledge graph from the first device 1000-1.

The first device knowledge graph may be a knowledge graph generated by the first device 1000-1. The first device knowledge graph may be generated based on operations executed in the first device 1000-1 and information collected by the first device 1000-1. The first device knowledge graph may be generated by the first device 1000-1, based on various operations executed in the first device 1000-1. The first device knowledge graph may include nodes and edges representing sequential operations executed in the first device 1000-1. The nodes and edges in the first device knowledge graph may be defined based on a series of time-series operations executed in the first device 1000-1. The nodes and edges for representing the operations executed in the first device 1000-1 may be determined based on context information related to the operations executed in the first device 1000-1.

In operation S605, the server 2000 may identify nodes and links between the nodes in the first device knowledge graph. The server 2000 may identify concepts in the first device knowledge graph, and meanings, properties, and relations of the concepts. For example, the server 2000 may identify classes and instances as concepts corresponding to the nodes in the first device knowledge graph. The server 2000 may identify relations and properties as relationships corresponding to edges in the first device knowledge graph.

In operation S610, the server 2000 may receive a second device knowledge graph from the second device 1000-2. The server 2000 may request the second device knowledge graph from the second device 1000-2 to update the server knowledge graph, and receive the second device knowledge graph from the second device 1000-2.

The server 2000 may request the second device 1000-2 to provide a knowledge graph related to a category, and the second device 1000-2 may provide a part of the second device knowledge graph related to the requested category, to the server 2000. In this case, the second device 1000-2 may abstract the second device knowledge graph according to a level and provide the abstracted second device knowledge graph to the server 2000. The second device 1000-2 may abstract the second device knowledge graph by abstractly expressing nodes and links between the nodes in the second device knowledge graph.

In a cycle or when an event occurs, the server 2000 may request the second device knowledge graph from the second device 1000-2. Alternatively, when the second device knowledge graph is updated by the second device 1000-2, the server 2000 may receive the second device knowledge graph from the second device 1000-2.

The second device knowledge graph may be a knowledge graph generated by the second device 1000-2. The second device knowledge graph may be generated based on operations executed in the second device 1000-2 and information collected by the second device 1000-2. The second device knowledge graph may be generated by the second device 1000-2, based on various operations executed in the second device 1000-2. The second device knowledge graph may include nodes and edges representing sequential operations executed in the second device 1000-2. The nodes and edges in the second device knowledge graph may be defined based on a series of time-series operations executed in the second device 1000-2. The nodes and edges for representing the operations executed in the second device 1000-2 may be determined based on context information related to the operations executed in the second device 1000-2.

In operation S615, the server 2000 may identify nodes and links between the nodes in the second device knowledge graph. The server 2000 may identify concepts in the second device knowledge graph, and meanings, properties, and relations of the concepts. For example, the server 2000 may identify classes and instances as concepts corresponding to the nodes in the second device knowledge graph. The server 2000 may identify relations and properties as relationships corresponding to edges in the second device knowledge graph.

In operation S620, the server 2000 may receive a third device knowledge graph from the third device 1000-3. The server 2000 may request the third device knowledge graph from the third device 1000-3 to update the server knowledge graph, and receive the third device knowledge graph from the third device 1000-3.

The server 2000 may request the third device 1000-3 to provide a knowledge graph related to a category, and the third device 1000-3 may provide a part of the third device knowledge graph related to the requested category, to the server 2000. In this case, the third device 1000-3 may abstract the third device knowledge graph according to a level and provide the abstracted third device knowledge graph to the server 2000. The third device 1000-3 may abstract the third device knowledge graph by abstractly expressing nodes and links between the nodes in the third device knowledge graph.

In a cycle or when an event occurs, the server 2000 may request the third device knowledge graph from the third device 1000-3. Alternatively, when the third device knowledge graph is updated by the third device 1000-3, the server 2000 may receive the third device knowledge graph from the third device 1000-3.

The third device knowledge graph may be a knowledge graph generated by the third device 1000-3. The third device knowledge graph may be generated based on operations executed in the third device 1000-3 and information collected by the third device 1000-3. The third device knowledge graph may be generated by the third device 1000-3, based on various operations executed in the third device 1000-3. The third device knowledge graph may include nodes and edges representing sequential operations executed in the third device 1000-3. The nodes and edges in the third device knowledge graph may be defined based on a series of time-series operations executed in the third device 1000-3. The nodes and edges for representing the operations executed in the third device 1000-3 may be determined based on context information related to the operations executed in the third device 1000-3.

In operation S625, the server 2000 may identify nodes and links between the nodes in the third device knowledge graph. The server 2000 may identify concepts in the third device knowledge graph, and meanings, properties, and relations of the concepts. For example, the server 2000 may identify classes and instances as concepts corresponding to the nodes in the third device knowledge graph. The server 2000 may identify relations and properties as relationships corresponding to edges in the third device knowledge graph.

In operation S630, the server 2000 may generate a knowledge graph for server knowledge graph extension, based on the identified nodes and links between the nodes. The server 2000 may identify knowledge triples repeated in the first to third device knowledge graphs, by comparing the identified nodes and links between the nodes. The server 2000 may determine similarity between the concepts corresponding to the nodes in the first device knowledge graph, the concepts corresponding to the nodes in the second device knowledge graph, and the concepts corresponding to the nodes in the third device knowledge graph. For example, the determining of the similarity between the concepts may include determining similarity between the classes and determining similarity between the instances. The server 2000 may determine similarity between the relationships corresponding to the edges in the first device knowledge graph, the relationships corresponding to the edges in the second device knowledge graph, and the relationships corresponding to the edges in the third device knowledge graph. For example, the determining of the similarity between the edges may include determining similarity between the properties and determining similarity between the relations.

The server 2000 may identify nodes and edges repeated in the first to third device knowledge graphs, by identifying nodes to which the same or similar edges are connected, from among nodes determined as being the same or similar. The server 2000 may identify nodes and edges repeated a number of times greater than or equal to a preset value, and generate the knowledge graph for server knowledge graph extension by using the identified nodes and edges.

The server 2000 may generate the knowledge graph for server knowledge graph extension by giving different weights to the first to third device knowledge graphs. For example, the server 2000 may give a first weight to the first device knowledge graph, a second weight to the second device knowledge graph, and a third weight to the third device knowledge graph, and generate the knowledge graph for server knowledge graph extension by considering the first to third weights. As such, nodes and edges in a device knowledge graph having a high weight may be reflected a lot on the knowledge graph for server knowledge graph extension.

In this case, the server 2000 may determine a weight for each device knowledge graph by considering, for example, a category of the device knowledge graph, the number of data used to generate the device knowledge graph, and the number of times that a user who has generated the device knowledge graph uses a device.

Figure 4:
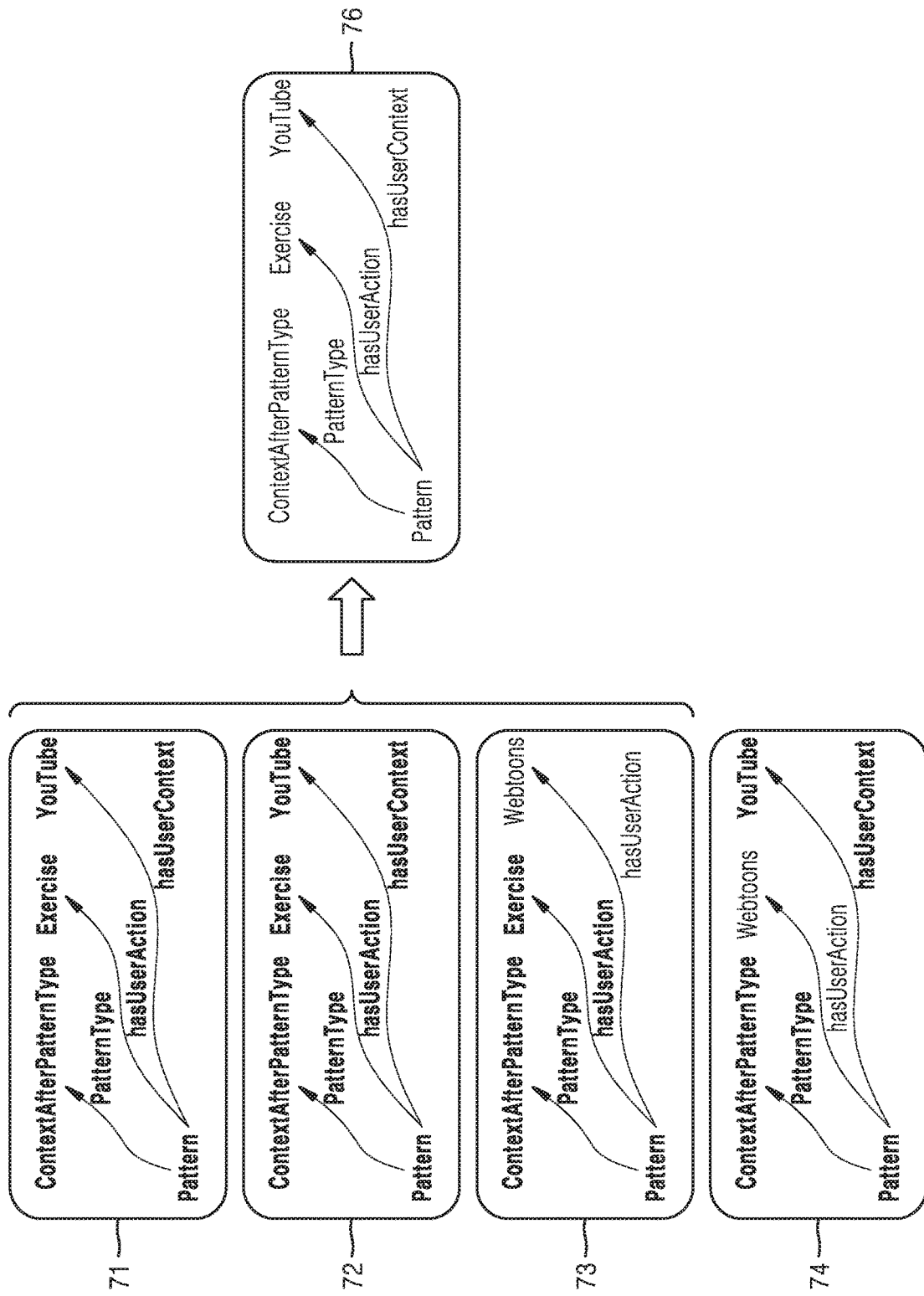
FIG. 4 is a diagram showing an example in which a server generates a knowledge graph for server knowledge graph extension, based on a plurality of device knowledge graphs, according to an embodiment.

FIG. 4 is a diagram showing an example in which the server 2000 generates a knowledge graph 76 for server knowledge graph extension, based on a plurality of device knowledge graphs, according to an embodiment.

Referring to FIG. 4, the server 2000 may generate the knowledge graph 76 for server knowledge graph extension, based on a first device knowledge graph 71, a second device knowledge graph 72, a third device knowledge graph 73, and a fourth device knowledge graph 74.

In the first to fourth device knowledge graphs 71 to 74, "Pattern-patternType-ContextAfterPatternType" is repeated four times, "Pattern-hasUserAction-Exercise" is repeated three times, "Pattern-hasUserContext-YouTube" is repeated three times, and "Pattern-hasUserAction-Webtoons" is repeated two times.

As such, the server 2000 may generate the knowledge graph 76 for server knowledge graph extension, based on knowledge triples repeated three or more times, e.g., "Pattern-patternType-ContextAfterPatternType", "Pattern-hasUserAction-Exercise", and "Pattern-hasUserContext-YouTube".

Figure 5:
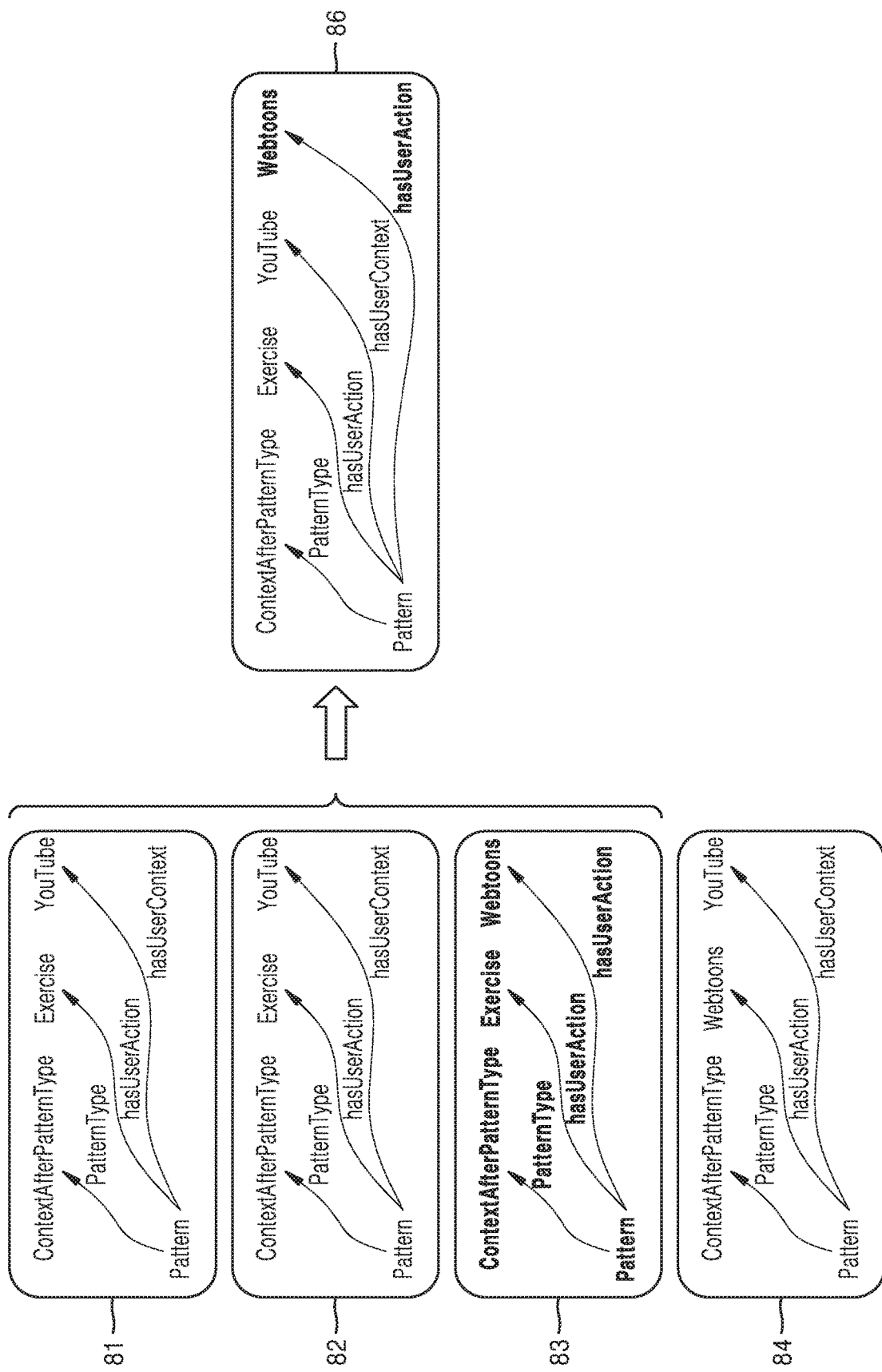
FIG. 5 is a diagram showing an example in which a server generates a knowledge graph for server knowledge graph extension by considering weights, according to an embodiment.

FIG. 5 is a diagram showing an example in which the server 2000 generates a knowledge graph 86 for server knowledge graph extension by considering weights, according to an embodiment.

Referring to FIG. 5, the server 2000 may generate the knowledge graph 86 for server knowledge graph extension, based on a first device knowledge graph 81, a second device knowledge graph 82, a third device knowledge graph 83, and a fourth device knowledge graph 84.

In this case, the server 2000 may give a high weight to the third device knowledge graph 83 such that nodes and edges in the third device knowledge graph 83 are included in the knowledge graph 86 for server knowledge graph extension. For example, when much raw data is used to generate the third device knowledge graph 83 or when a category of the third device knowledge graph 83 is the same as the category of data required to extend a server knowledge graph, a high weight may be given to the third device knowledge graph 83.

Because a high weight is given to the third device knowledge graph 83, a knowledge triple repeated two times in the first to fourth device knowledge graphs 81 to 84, e.g., "Pattern-hasUserAction-Webtoons", may be included in the knowledge graph 86 for server knowledge graph extension.

Figure 6:
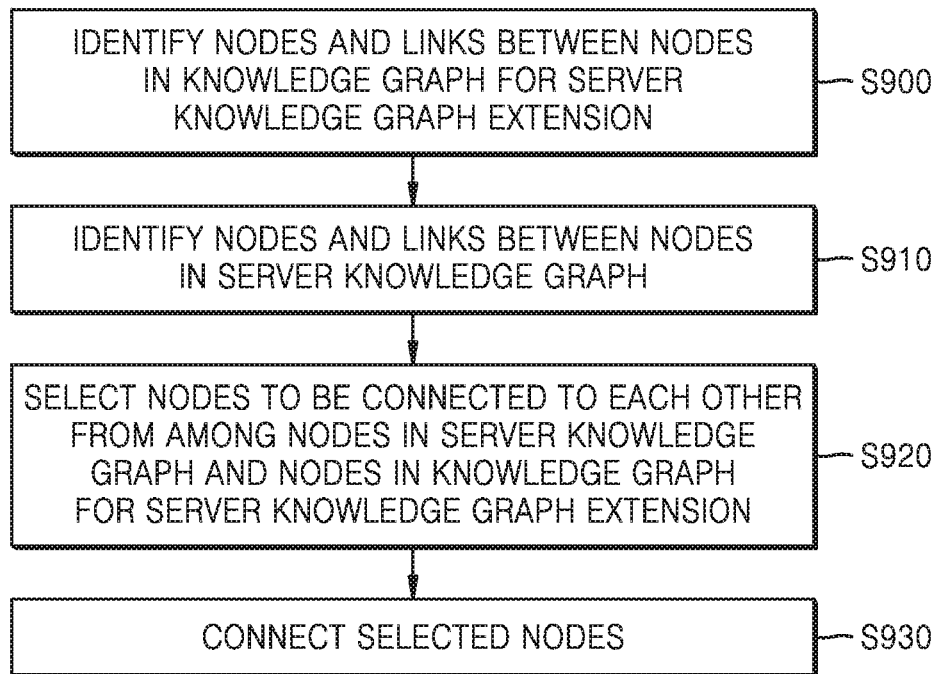
FIG. 6 is a flowchart of a method, performed by a server, of extending a server knowledge graph, according to an embodiment.

FIG. 6 is a flowchart of a method, performed by the server 2000, of extending a server knowledge graph, according to an embodiment.

In operation S900, the server 2000 may identify nodes and links between the nodes in a knowledge graph for server knowledge graph extension. The server 2000 may identify concepts in the knowledge graph for server knowledge graph extension, and meanings, properties, and relations of the concepts. For example, the server 2000 may identify classes and instances as concepts corresponding to nodes in the knowledge graph for server knowledge graph extension. The server 2000 may identify relations and properties as relationships corresponding to edges in the knowledge graph for server knowledge graph extension.

In operation S910, the server 2000 may identify nodes and links between the nodes in the server knowledge graph. The server 2000 may identify concepts in the server knowledge graph, and meanings, properties, and relations of the concepts. For example, the server 2000 may identify classes and instances as concepts corresponding to nodes in the server knowledge graph. The server 2000 may identify relations and properties as relationships corresponding to edges in the server knowledge graph.

In operation S920, the server 2000 may select nodes to be connected to each other from among the nodes in the server knowledge graph and the nodes in the knowledge graph for server knowledge graph extension.

The server 2000 may identify the same or similar nodes from among the nodes in the server knowledge graph and the nodes in the knowledge graph for server knowledge graph extension. The server 2000 may identify the same or similar classes and the same or similar instances. The server 2000 may identify the same or similar edges from among the edges in the server knowledge graph and the edges in the knowledge graph for server knowledge graph extension. The server 2000 may identify the same or similar properties and the same or similar relations. The server 2000 may select nodes to be connected to each other from among the same or similar nodes according to a preset criterion.

Figure 9:
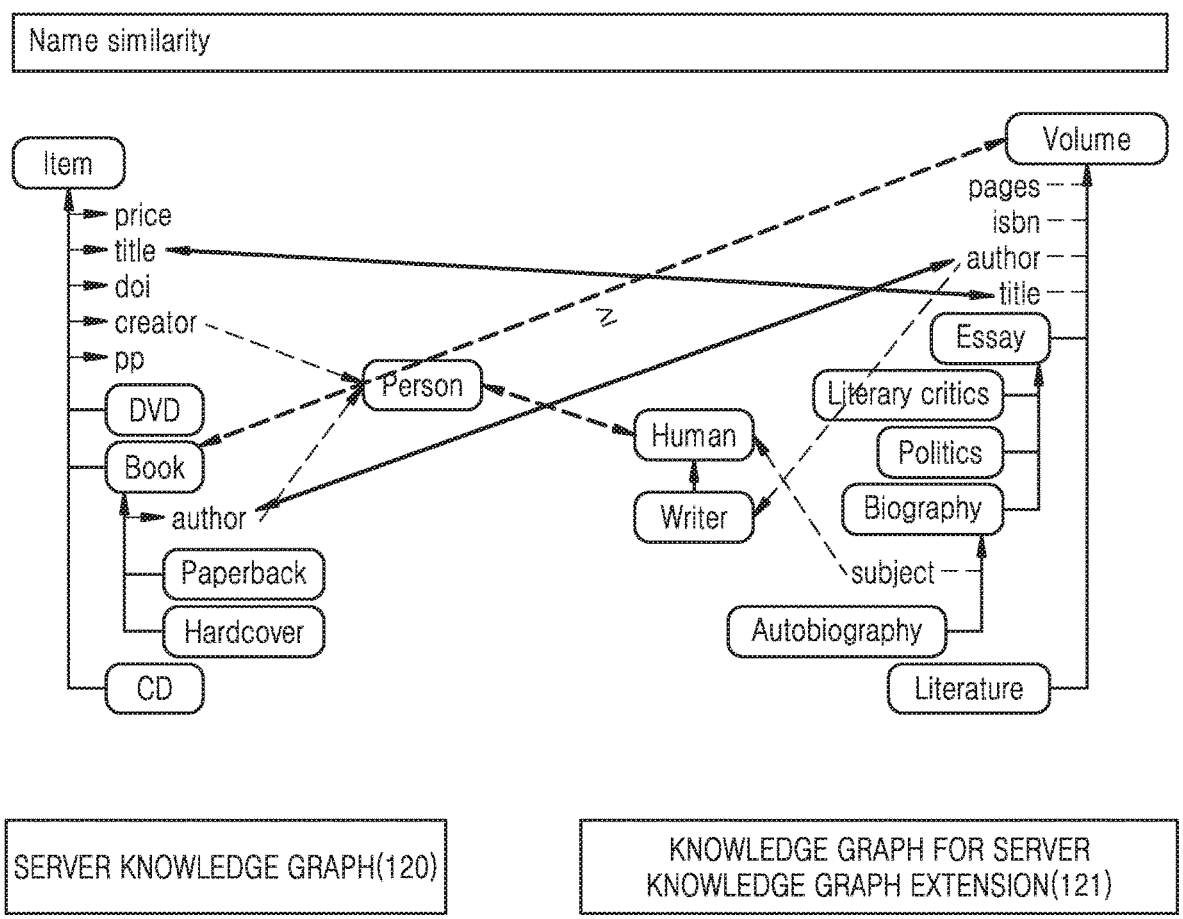
FIG. 9 is a diagram showing an example in which a server connects nodes, based on similarity of names of classes, according to an embodiment.

For example, referring to FIG. 9, the server 2000 may select the nodes to be connected, based on similarity of names of classes. "Author" in a server knowledge graph 120 may have the same name as "author" in a knowledge graph 121 for server knowledge graph extension, and "title" in the server knowledge graph 120 may have the same name as "title" in the knowledge graph 121 for server knowledge graph extension. The server 2000 may select the nodes to connect "author" in the server knowledge graph 120 to "author" in the knowledge graph 121 for server knowledge graph extension, and connect "title" in the server knowledge graph 120 to "title" in the knowledge graph 121 for server knowledge graph extension.

"Person" in the server knowledge graph 120 may be determined as being similar to "Human" in the knowledge graph 121 for server knowledge graph extension. In this case, the server 2000 may determine that "Person" is similar to "Human", by using a pre-registered synonym dictionary. The server 2000 may select the nodes determined as being similar to each other, e.g., "Person" and "Human", as the nodes to be connected to each other.

"Book" in the server knowledge graph 120 may be determined as being similar to "Volume" in the knowledge graph 121 for server knowledge graph extension. In this case, the server 2000 may determine whether "Book" is similar to "Volume", by comparing meanings and properties of sub-nodes connected to "Book", e.g., "author", "Paperback", and "Hardcover", with meanings and properties of sub-nodes connected to "Volume", e.g., "pages", "isbn", "author", and "title". The server 2000 may select the nodes determined as being similar to each other, e.g., "Book" and "Volume", as the nodes to be connected to each other.

Figure 10:
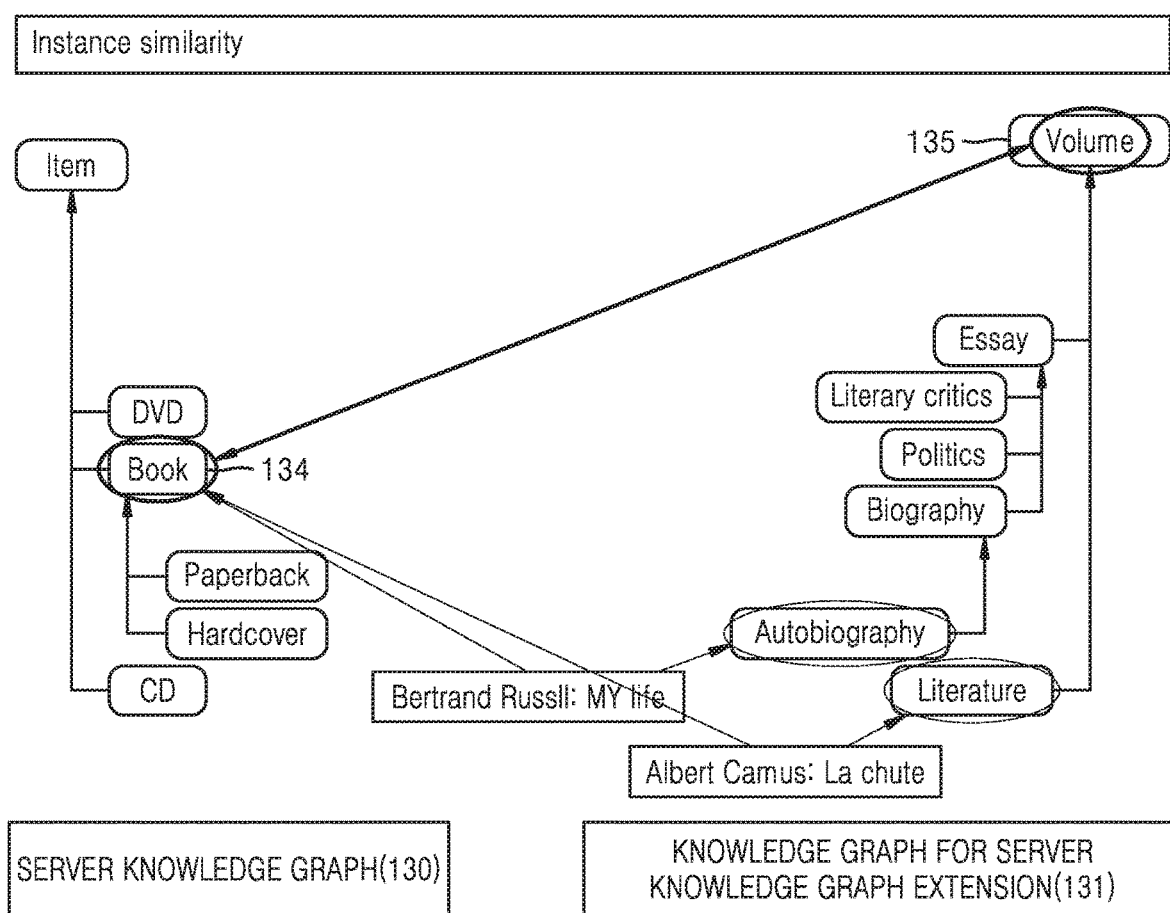
FIG. 10 is a diagram showing an example in which a server connects nodes, based on similarity of instances, according to an embodiment.

For example, referring to FIG. 10, the server 2000 may select the nodes to be connected, based on similarity of instances. An instance related to "Book" 134 in a server knowledge graph 130, e.g., "Bertrand Russell: My life", may be the same as an instance related to "Autobiography" in a knowledge graph 131 for server knowledge graph extension, e.g., "Bertrand Russell: My life". An instance related to "Book" 134 in the server knowledge graph 130, e.g., "Albert Camus: La chute", may be the same as an instance related to "Literature" in the knowledge graph 131 for server knowledge graph extension, e.g., "Albert Camus: La chute".

The server 2000 may connect "Book" 134 to which "Bertrand Russell: My life" and "Albert Camus: La chute" are connected, to "Volume" 135 to which "Bertrand Russell: My life" and "Albert Camus: La chute" are directly or indirectly connected.

Figure 11:
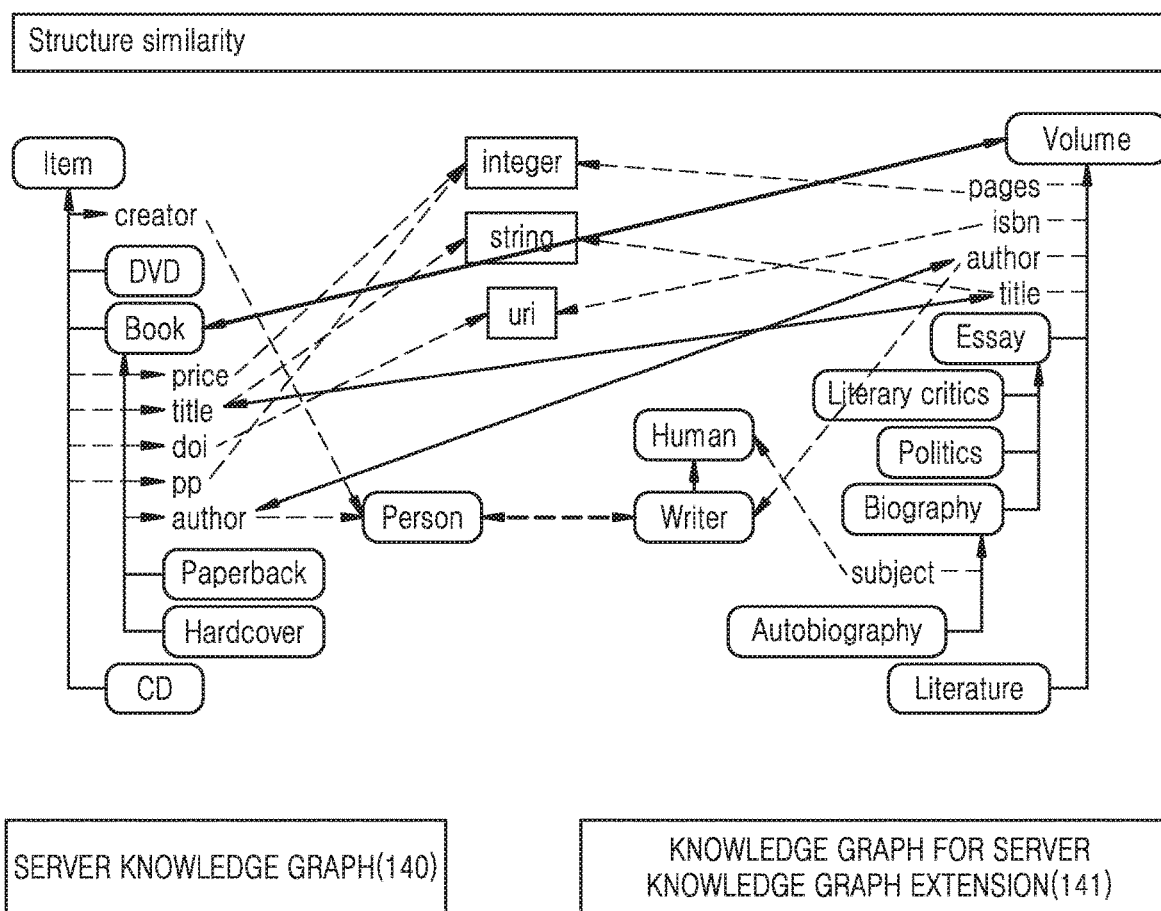
FIG. 11 is a diagram showing an example in which a server connects nodes, based on similarity of structures in knowledge graphs, according to an embodiment.

For example, referring to FIG. 11, the server 2000 may select the nodes to be connected, based on similarity of structures in knowledge graphs. The server 2000 may determine that "title" and "author" from among nodes in a server knowledge graph 140 are the same as "title" and "author" from among nodes in a knowledge graph 141 for server knowledge graph extension.

The server 2000 may compare a structure of other nodes and knowledge triples connected to "title" and "author" in the server knowledge graph 140, with a structure of other nodes and knowledge triples connected to "title" and "author" in the knowledge graph 141 for server knowledge graph extension.

For example, in the server knowledge graph 140, the server 2000 may identify that properties of sub-nodes, e.g., "price" and "pp", connected to a higher node, e.g., "Book", of "author" indicate "integer", identify that properties of a sub-node, e.g., "title", connected to "Book" indicate "string", and identify that properties of a sub-node, e.g., "doi", connected to "Book" indicate "uri". In the knowledge graph 141, the server 2000 may identify that properties of a sub-node, e.g., "pages", connected to "Volume" indicate "integer", identify that properties of a sub-node, e.g., "title", connected to "Volume" indicate "string", and identify that properties of a sub-node, e.g., "isbn", connected to "Volume" indicate "uri". The server 2000 may connect higher nodes to which sub-nodes having similar names and properties are connected in similar structures, e.g., "Book" and "Volume", to each other.

Figures 12, 13:
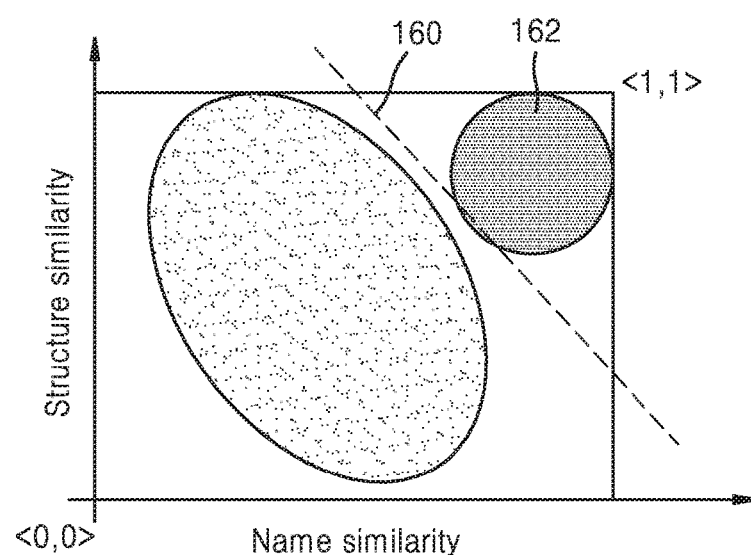
FIG. 12 is a diagram showing an example of similarities of nodes calculated based on names of the nodes, according to an embodiment.
FIG. 13 is a diagram showing an example in which a server determines similarity of nodes by considering similarity of names together with similarity of structures, according to an embodiment.

For example, referring to FIG. 12, the server 2000 may calculate similarity of nodes, based on names of the nodes. The server 2000 may calculate similarity of nodes by comparing names of classes or instances corresponding to the nodes. For example, the server 2000 may calculate a similarity between "John Smith" and "Johan Smith" to be "0.8" by comparing characters in "John Smith" with characters in "Johan Smith".

The server 2000 may calculate a similarity between "Software Eng." and "Software Dev Eng." to be "0.7" by comparing words in "Software Eng." with words in "Software Dev Eng.". In this case, the server 2000 may use dictionary information pre-registered in the server 2000, to compare the words in "Software Eng." with the words in "Software Dev Eng.".

For example, the server 2000 may determine that "Seattle" is identical to "Seattle", and calculate a similarity between "Seattle" and "Seattle" to be "1.0".

For example, referring to FIG. 13, the server 2000 may determine similarity of nodes by considering similarity of names together with similarity of structures. The server 2000 may consider similarity of names of nodes together with similarity of structures of the nodes to determine the nodes to be connected to each other. In a graph of FIG. 13, when similarity of names of nodes and similarity of structures of the nodes are included in a region 162 higher than a threshold 160, the server 2000 may determine the nodes as the nodes to be connected to each other.

In operation S930, the server 2000 may connect the nodes selected from among the nodes in the server knowledge graph and the nodes in the knowledge graph for server knowledge graph extension. The server 2000 may determine links of the nodes selected in operation S920, and connect the nodes selected in operation S920, to each other through edges according to the determined links.

Figure 7:
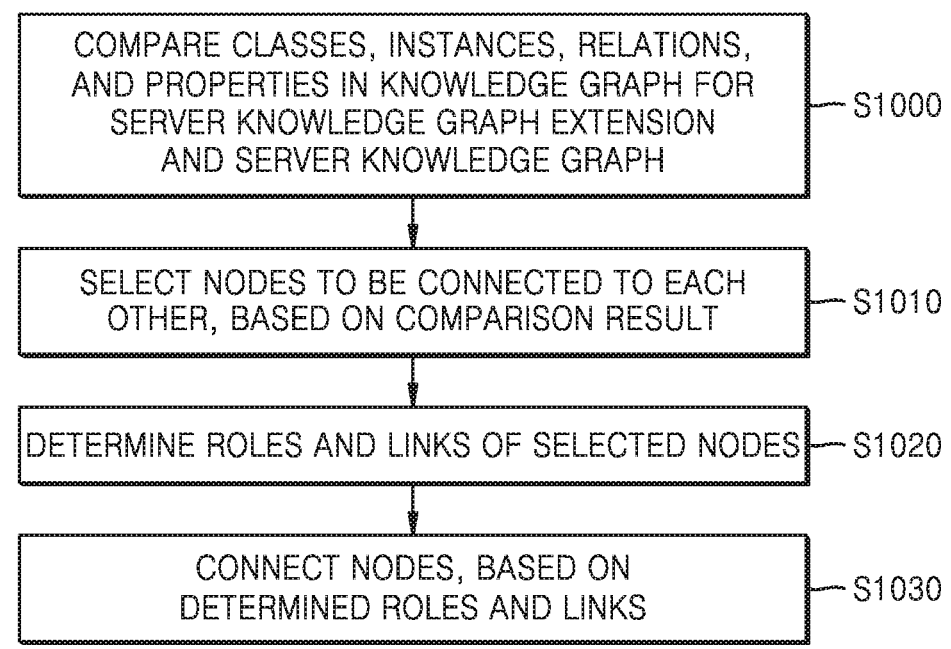
FIG. 7 is a flowchart of a method, performed by a server, of connecting nodes in a knowledge graph for server knowledge graph extension and a server knowledge graph, according to an embodiment.

FIG. 7 is a flowchart of a method, performed by the server 2000, of connecting nodes in a knowledge graph for server knowledge graph extension and a server knowledge graph, according to an embodiment.

In operation S1000, the server 2000 may compare classes, instances, relations, and properties in the knowledge graph for server knowledge graph extension and the server knowledge graph. The server 2000 may determine whether classes having the same or similar names as the classes in the knowledge graph for server knowledge graph extension are present in the server knowledge graph. The server 2000 may use dictionary information including synonym information, to determine similarity of classes. Alternatively, the server 2000 may use a preset natural language understanding (NLU) model to determine similarity of classes.

The server 2000 may determine whether instances having the same or similar names as the instances in the knowledge graph for server knowledge graph extension are present in the server knowledge graph. The server 2000 may use dictionary information including synonym information, to determine similarity of instances. Alternatively, the server 2000 may use a preset NLU model to determine similarity of instances.

The server 2000 may compare a structure of the knowledge graph for server knowledge graph extension with a structure of the server knowledge graph. The server 2000 may compare relations and properties corresponding to edges connected to the same or similar nodes. The server 2000 may determine whether knowledge triples the same as or similar to knowledge triples in the knowledge graph for server knowledge graph extension are present in the server knowledge graph, by determining whether the same or similar edges are connected to the same or similar nodes.

In operation S1010, the server 2000 may select nodes to be connected to each other, based on the comparison result. The server 2000 may select the nodes to be connected to each other, considering similarity of nodes. Alternatively, the server 2000 may select nodes in the same or similar knowledge triples as the nodes to be connected to each other, considering similarity of structures. Alternatively, the server 2000 may select the nodes to be connected to each other, by considering both of similarity of nodes and similarity of structures.

In operation S1020, the server 2000 may determine roles and links of the selected nodes. The server 2000 may assign a head role or a tail role to each of the selected nodes. The server 2000 may assign a head role and a tail role to two nodes to be connected to each other from among the selected nodes. For example, the server 2000 may identify sub-nodes connected to a first node and links with the sub-nodes, and identify sub-nodes connected to a second node and links with the sub-nodes. The server 2000 may use a preset NLU model to analyze the sub-nodes connected to the first node and the links with the sub-nodes, and the sub-nodes connected to the second node and the links with the sub-nodes. The server 2000 may assign a head role to the first node and assign a tail role to the second node, based on the identification result or the analysis result.

The server 2000 may analyze the sub-nodes connected to the first node and the links with the sub-nodes, and the sub-nodes connected to the second node and the links with the sub-nodes, and determine a relation between the first and second nodes, based on the analysis result.

In operation S1030, the server 2000 may connect the nodes to each other, based on the determined roles and links. For example, the server 2000 may connect the second node having a tail role to the first node having a head role through an edge having the relation determined in operation S1020.

Figure 8:
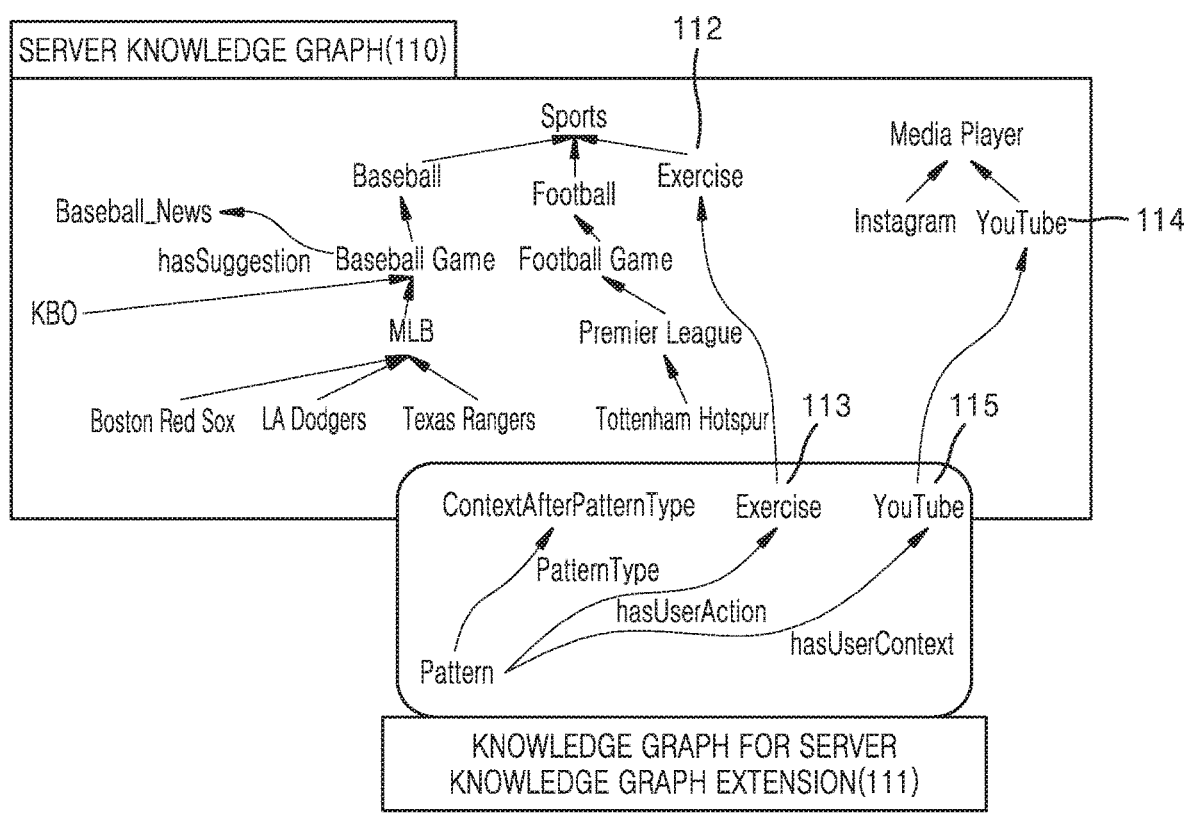
FIG. 8 is a diagram showing an example in which a server extends a server knowledge graph, according to an embodiment.

FIG. 8 is a diagram showing an example in which the server 2000 extends a server knowledge graph 110, according to an embodiment.

Referring to FIG. 8, the server knowledge graph 110 may be a knowledge graph extended based on a knowledge graph representing knowledge information. The knowledge graph representing knowledge information is a knowledge graph generated by connecting higher and sub-nodes to each other, and may be a knowledge graph used for a search service. For example, a concept represented by a node 112 in the server knowledge graph 110 may have the same value, e.g., "Exercise", as a concept represented by a node 113 in a knowledge graph 111 for server knowledge graph extension. For example, a concept represented by a node 114 in the server knowledge graph 110 may have the same value, e.g., "YouTube", as a concept represented by a node 115 in the knowledge graph 111 for server knowledge graph extension.

The server 2000 may assign head roles to the nodes 112 and 114, assign tail roles to the nodes 113 and 115, connect the nodes 112 and 113 representing "Exercise", and connect the nodes 113 and 115 representing "YouTube".

The server 2000 may determine a link between the nodes 112 and 113, based on other nodes and links connected to the node 112 in the server knowledge graph 110, and other nodes and links connected to the node 113 in the knowledge graph 111 for server knowledge graph extension.

Figure 14:
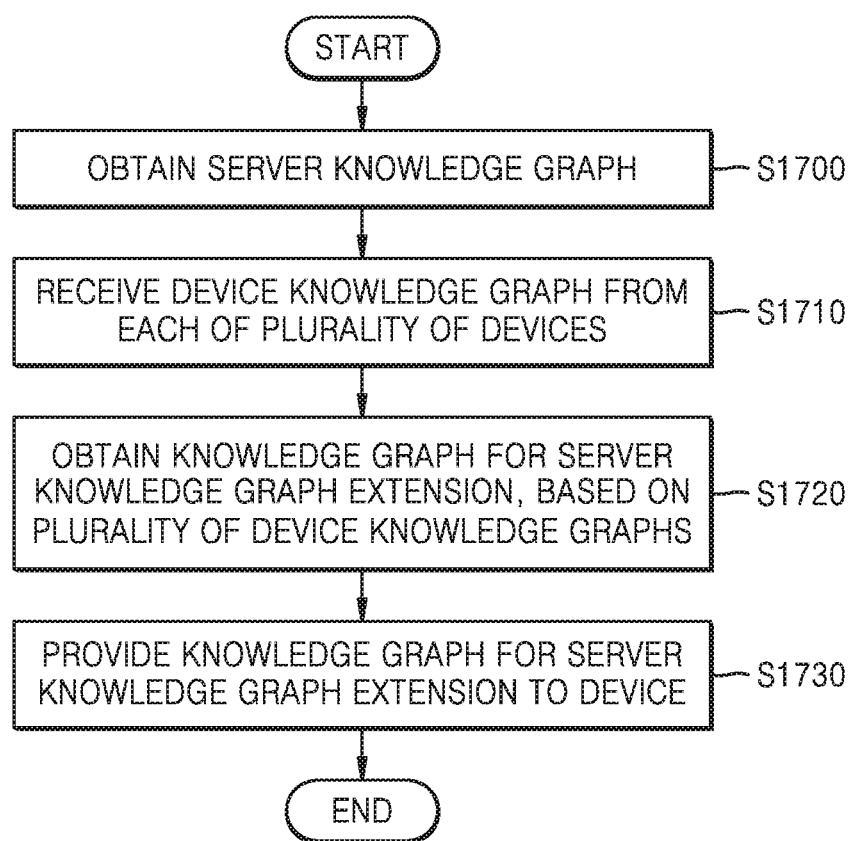
FIG. 14 is a flowchart of a method, performed by a server, of providing a knowledge graph used for server knowledge graph extension to a device, according to an embodiment.

FIG. 14 is a flowchart of a method, performed by the server 2000, of providing a knowledge graph used for server knowledge graph extension to the device 1000, according to an embodiment.

Operations S1700 to S1720 correspond to operations S200 to S220 of FIG. 2, and thus are not repeatedly described herein.

In operation S1730, the server 2000 may provide the knowledge graph for server knowledge graph extension to the device 1000. The server 2000 may provide the knowledge graph for server knowledge graph extension to the device 1000 in response to a request from the device 1000. In this case, the server 2000 may provide the knowledge graph for server knowledge graph extension to the device 1000 that has not provided a device knowledge graph. The device 1000 may update the device knowledge graph by using the knowledge graph for server knowledge graph extension.

Figure 15:
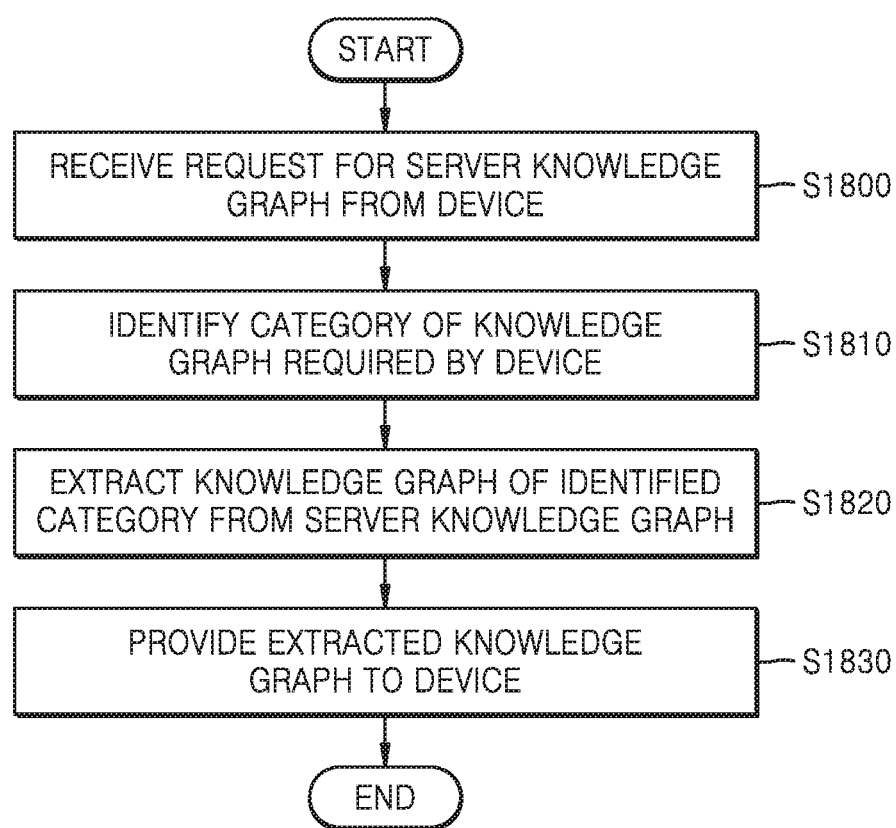
FIG. 15 is a flowchart of a method, performed by a server, of providing a part of a server knowledge graph to a device, according to an embodiment.

FIG. 15 is a flowchart of a method, performed by the server 2000, of providing a part of a server knowledge graph to the device 1000, according to an embodiment.

In operation S1800, the server 2000 may receive a request for the server knowledge graph from the device 1000. The device 1000 may request the server knowledge graph from the server 2000 and signal a value indicating a category of a knowledge graph required by the device 1000, to the server 2000.

In operation S1810, the server 2000 may identify the category of the knowledge graph required by the device 1000. The server 2000 may identify a category corresponding to the category value received from the device 1000, from among categories of sub-server knowledge graphs included in the server knowledge graph. For example, the categories of the sub-server knowledge graphs included in the server knowledge graph may include chat, search, recommendation, and dictionary, but are not limited thereto.

In operation S1820, the server 2000 may extract a knowledge graph of the identified category from the server knowledge graph. The server 2000 may extract a sub-server knowledge graph corresponding to the identified category, from among the sub-server knowledge graphs in the server knowledge graph. The server 2000 may extract a part of the sub-server knowledge graph corresponding to the identified category. In this case, the server 2000 may receive, from the device 1000, information on nodes and edges included in a device knowledge graph, and extract, from the sub-server knowledge graph, a set of knowledge triples related to the nodes and edges included in the device knowledge graph.

In operation S1830, the server 2000 may provide the extracted knowledge graph to the device 1000. The device 1000 may update the device knowledge graph by using the extracted knowledge graph.

Figure 16:
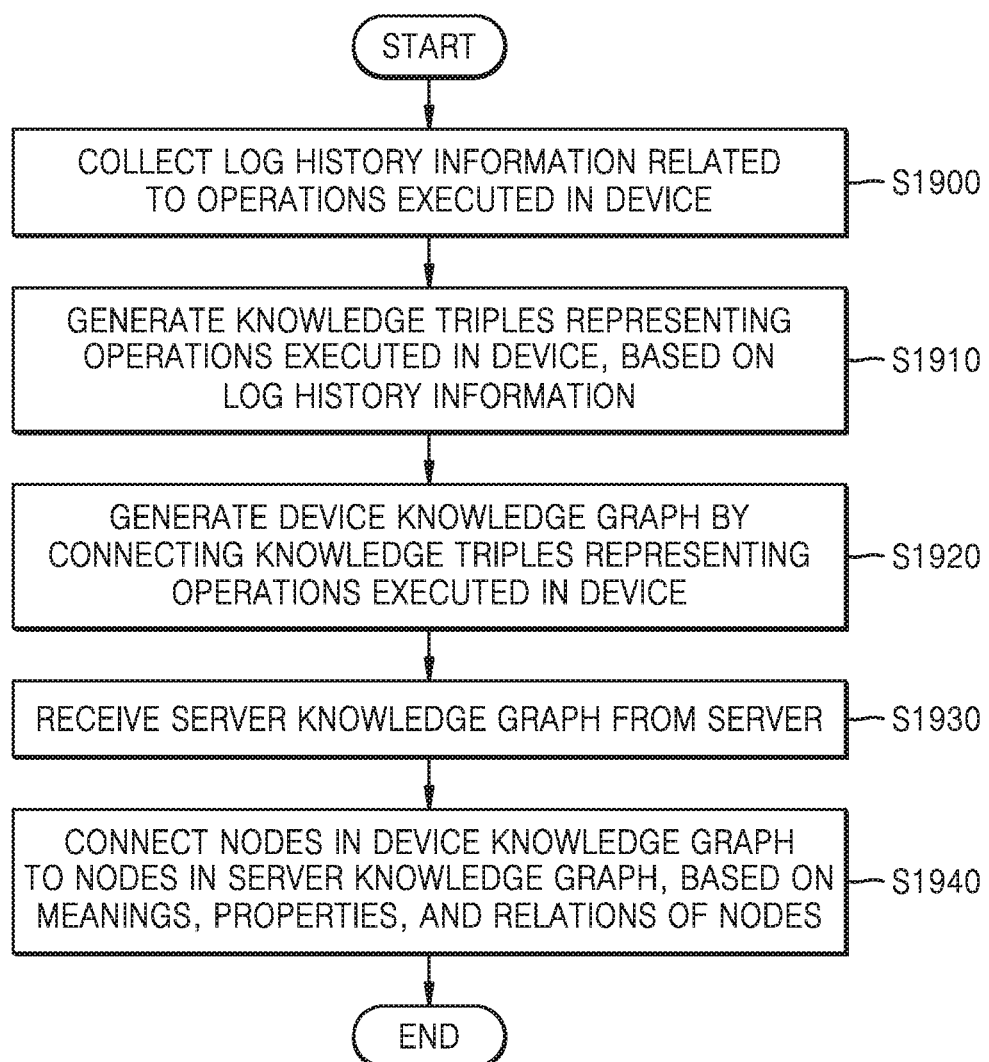
FIG. 16 is a flowchart of a method, performed by a device, of updating a device knowledge graph, according to an embodiment.

FIG. 16 is a flowchart of a method, performed by the device 1000, of updating a device knowledge graph, according to an embodiment.

In operation S1900, the device 1000 may collect log history information related to operations executed in the device 1000. The log history information may include recording of context information related to operations executed in the device 1000, over time. The log history information may represent internal or external situations of the device 1000 in relation to the operations executed in the device 1000. The context information related to the operations executed in the device 1000 may include, for example, information on functions executed in the device 1000, contents executed by the device 1000, a status of the device 1000, and an ambient environment of the device 1000.

In operation S1910, the device 1000 may generate knowledge triples representing the operations executed in the device 1000, based on the log history information. The device 1000 may process the collected log history information into data usable to generate a device knowledge graph. The device 1000 may generate knowledge triples representing a series of sequential operations executed in the device 1000, by converting the collected log history information into knowledge.

The device 1000 may generate a device knowledge graph by analyzing the log history information according to a preset ontology schema. According to the ontology schema, nodes included in a knowledge graph and relations between the nodes may be defined. The device 1000 may generate a device knowledge graph 2302 by using, for example, an ontology schema for connecting a relation of a node representing a Need, a node representing an Activity, or a node representing a Profile, to a node representing a USER. In this case, the device 1000 may obtain, for example, information 'USER hasActivity' in relation to the Activity of the USER, by analyzing the log history information, and generate knowledge triples to be included in the device knowledge graph, by providing the obtained information to nodes and edges according to the ontology schema. The device 1000 may generate the device knowledge graph by connecting the generated knowledge triples according to the ontology schema.

The device 1000 may compare the device knowledge graph 2302 with a server knowledge graph 2301, and extend the device knowledge graph 2302 by connecting at least one node in the device knowledge graph 2302 to at least one node in the server knowledge graph 2301.

The device 1000 may generate knowledge triples representing an operation pattern of the device 1000, by analyzing the operations executed in the device 1000, based on the log history information. The operation pattern of the device 1000 may represent a series of operations of the device 1000 that are repeated in a situation a number of times greater than or equal to a threshold. For example, the device 1000 may identify that the device 1000 repeats an operation (e.g., watching YouTube videos related to a baseball) in a situation (e.g., booking a baseball game) a number of times greater than or equal to the threshold, by analyzing which operation is executed in which situation by the device 1000, based on the log history information. The device 1000 may generate the knowledge triples representing the operation pattern of the device 1000, by connecting a node representing the situation (e.g., booking a baseball game) to a node representing the operation (e.g., watching YouTube videos related to a baseball).

In operation S1920, the device 1000 may generate a device knowledge graph by connecting the knowledge triples representing the operations executed in the device 1000. The device 1000 may compare nodes and edges for configuring the knowledge triples, to assign roles to the nodes, and connect the nodes to each other, based on relations between the nodes.

The device 1000 may detect matching concepts from raw data or knowledge triples, based on a probabilistic matching model, a distance-based model, declarative matching rules and constraints, or the like. The device 1000 may perform knowledge refinement on the detected concepts. For example, the device 1000 may refine the detected concepts by using knowledge fusion, error detection, fact inference, or the like. Through the above-described procedure, the device 1000 may generate a device knowledge graph by obtaining knowledge triples related to generation of a knowledge graph, and structuralizing and connecting the obtained knowledge triples.

Because the device knowledge graph is generated based on log history information of a device of a user, the device knowledge graph may be a graph in which knowledge specialized for the user is enhanced.

In operation S1930, the device 1000 may receive a server knowledge graph from the server 2000. The device 1000 may request the server knowledge graph from the server 2000, and receive the server knowledge graph provided from the server 2000. The device 1000 may request the server knowledge graph from the server 2000 and provide information for identifying a category of a service provided by the device 1000, to the server 2000. In this case, the server 2000 may provide at least a part of the server knowledge graph corresponding to the category of the service provided by the device 1000, to the device 1000. The category of the service may include, for example, broadcasting, content sharing, content providing, power management, game providing, chat, word processing, dictionary information providing, search, call, imaging, transportation recommendation, or video playback, but is not limited thereto.

In operation S1940, the device 1000 may connect nodes in the device knowledge graph to nodes in the server knowledge graph, based on meanings, properties, and relations of the nodes. The device 1000 may detect matching nodes from the server knowledge graph and the knowledge triples, based on a probabilistic matching model, a distance-based model, declarative matching rules and constraints, or the like. The device 1000 may perform knowledge refinement on the detected nodes. For example, the device 1000 may refine the detected nodes by using knowledge fusion, error detection, fact inference, or the like. Through the above-described procedure, the device 1000 may generate the device knowledge graph by structuralizing and connecting the server knowledge graph and the knowledge triples.

Figure 17:
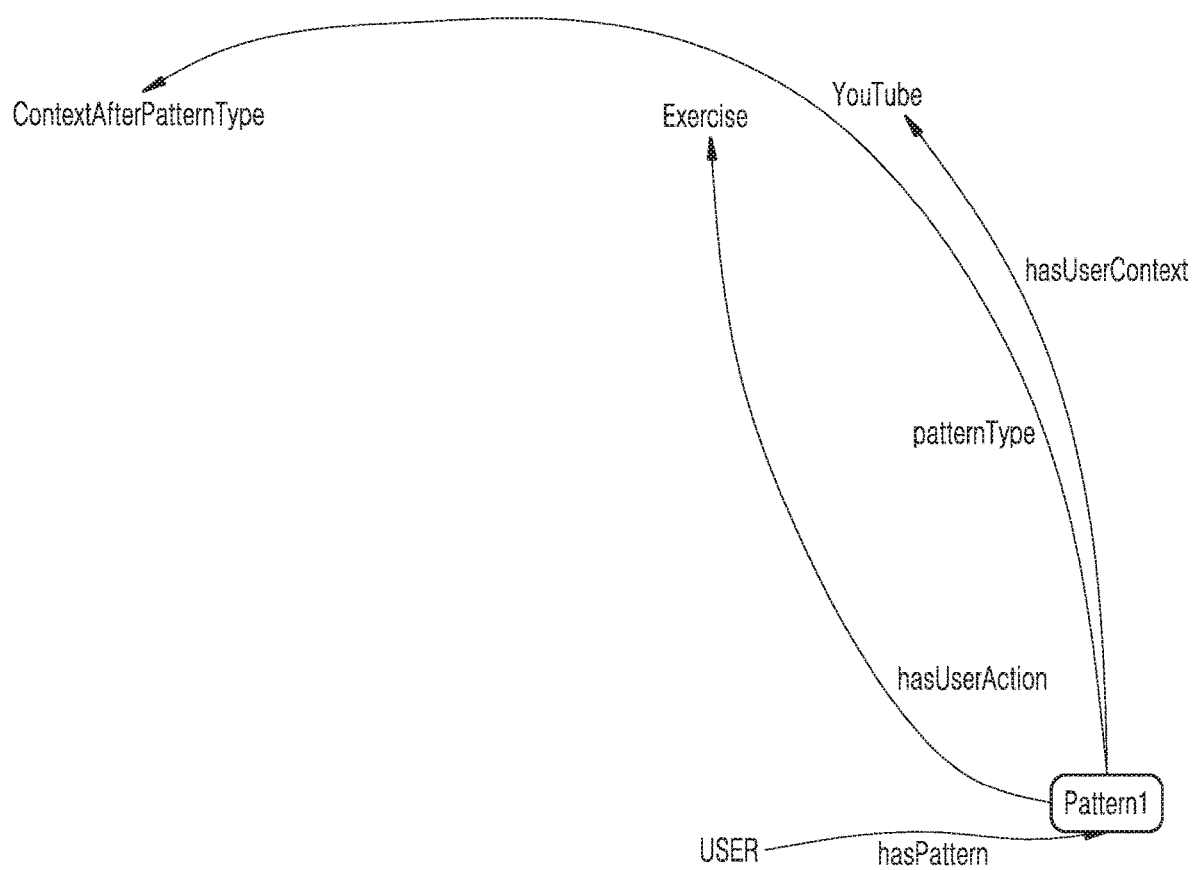
FIG. 17 is a diagram for describing an example of knowledge triples generated based on an operation pattern of a device, according to an embodiment.

FIG. 17 is a diagram for describing an example of knowledge triples generated based on an operation pattern of the device 1000, according to an embodiment.

Referring to FIG. 17, the device 1000 may generate knowledge triples representing an operation pattern of the device 1000, based on operations of the device 1000.

The device 1000 may analyze operations executed in the device 1000 and operating times of the device 1000, based on log history information related to the operations executed in the device 1000. For example, the device 1000 may identify operations "Activity 1", "Activity 2", "Activity 3", "Activity 4", "Activity 5", and "Activity 6" executed in the device 1000 and times when the operations are executed. For example, the device 1000 may identify that "Activity 1" is executed at 20:00 on Aug. 1, 2019, "Activity 2" is executed at 21:00 on Aug. 1, 2019, "Activity 3" is executed at 17:00 on Aug. 3, 2019, "Activity 4" is executed at 18:00 on Aug. 3, 2019, "Activity 5" is executed at 21:00 on Aug. 4, 2019, and "Activity 6" is executed at 22:00 on Aug. 4, 2019. The device 1000 may also identify that "Activity 2", "Activity 4", and "Activity 6" are operations related to exercise booking, and "Activity 1", "Activity 3", and "Activity 5" are operations related to a YouTube application. The device 1000 may generate knowledge triples representing a situation when each of the identified operations is executed.

The device 1000 may identify that operations related to exercise booking are repeated three times and operations related to the YouTube application are repeated three times, based on the identified operations. As such, the device 1000 may identify an operation pattern of executing the YouTube application after booking exercise.

For example, the device 1000 may generate knowledge triples such as "USER-hasPattern-Pattern1" representing a knowledge triple related to an operation pattern of a user, "Pattern1-patternType-ContextAfterPatternType" representing a knowledge triple related to an operation after a situation, "Pattern1-hasUserContext-YouTube" representing a situation related to the operation pattern, and "Pattern1-hasUserAction-Exercise" representing an operation related to the operation pattern, based on the operation pattern of executing the YouTube application after booking exercise. The knowledge triples based on the operation pattern may be configured as abstracted information compared to the knowledge triples representing "Activity 1", "Activity 2", "Activity 3", "Activity 4", "Activity 5", and "Activity 6", but are not limited thereto.

The device 1000 may generate an operation pattern, based on repeated data columns or log information from among data stored in a data base (DB). In this case, for example, the device 1000 may identify types and orders of the data stored in the DB, and identify an operation pattern related to operations executed in the device 1000, by analyzing the types and orders of the data.

Figure 18:
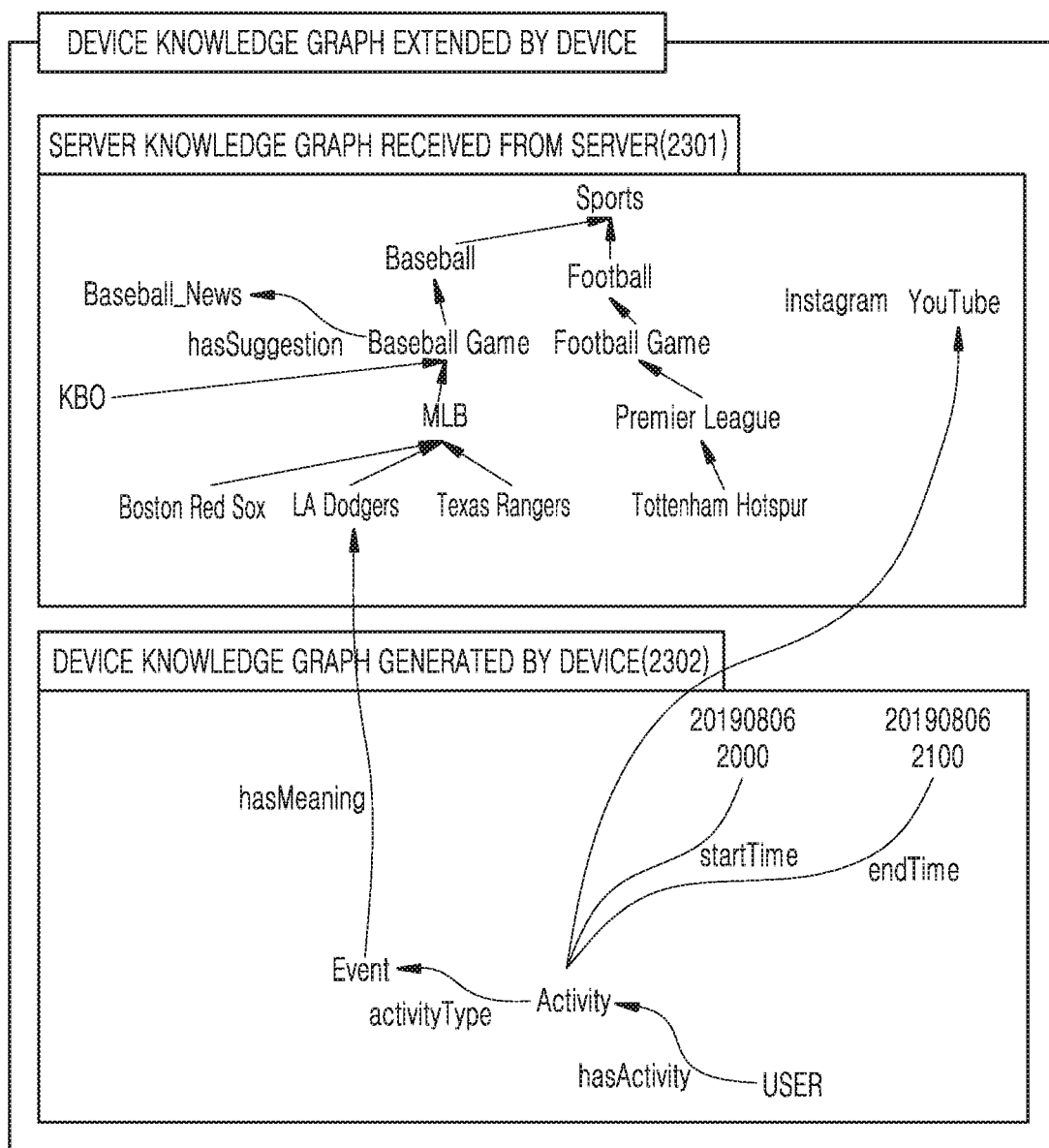
FIG. 18 is a diagram showing an example in which a device generates and extends a device knowledge graph by using a server knowledge graph, according to an embodiment.

FIG. 18 is a diagram showing an example in which the device 1000 generates and extends a device knowledge graph 2302 by using a server knowledge graph 2301 received from the server 2000, according to an embodiment.

Referring to FIG. 18, when a user executes an operation of the device 1000, the device knowledge graph 2302 may be generated and extended. When the user of the device 1000 watches a game of the 'LA Dodgers' at a time (e.g., 20:00 to 21:00) by using a YouTube application, the device 1000 may generate the device knowledge graph 2302 by using log history information related to operations of the device 1000.

The device 1000 may generate the device knowledge graph 2302 by analyzing the log history information according to a preset ontology schema. According to the ontology schema, nodes included in a knowledge graph and relations between the nodes may be defined. The device 1000 may generate the device knowledge graph 2302 by using, for example, an ontology schema for connecting a relation of a node representing a Need, a node representing an Activity, or a node representing a Profile, to a node representing a USER. In this case, for example, in relation to the Activity of the USER, information 'USER hasActivity' may be included in the device knowledge graph 2302.

The device 1000 may compare the device knowledge graph 2302 with the server knowledge graph 2301 received from the server 2000, and extend the device knowledge graph 2302 by connecting at least one node in the device knowledge graph 2302 to at least one node in the server knowledge graph 2301.

For example, an Event node of the device knowledge graph 2302 may be connected to a 'LA Dodgers' node of the server knowledge graph 2301. As such, the device 1000 may recommend baseball news to the USER through links from the 'LA Dodgers' node to a 'Baseball News' node. To recommend contents to the user, the device 1000 may use, for example, inference using queries and rules based on an ontology schema. For example, the device 1000 may select contents to be recommended, by using a query for finding a node directly or indirectly connected though a 'hasSuggestion' edge to the USER node.

Figure 19:
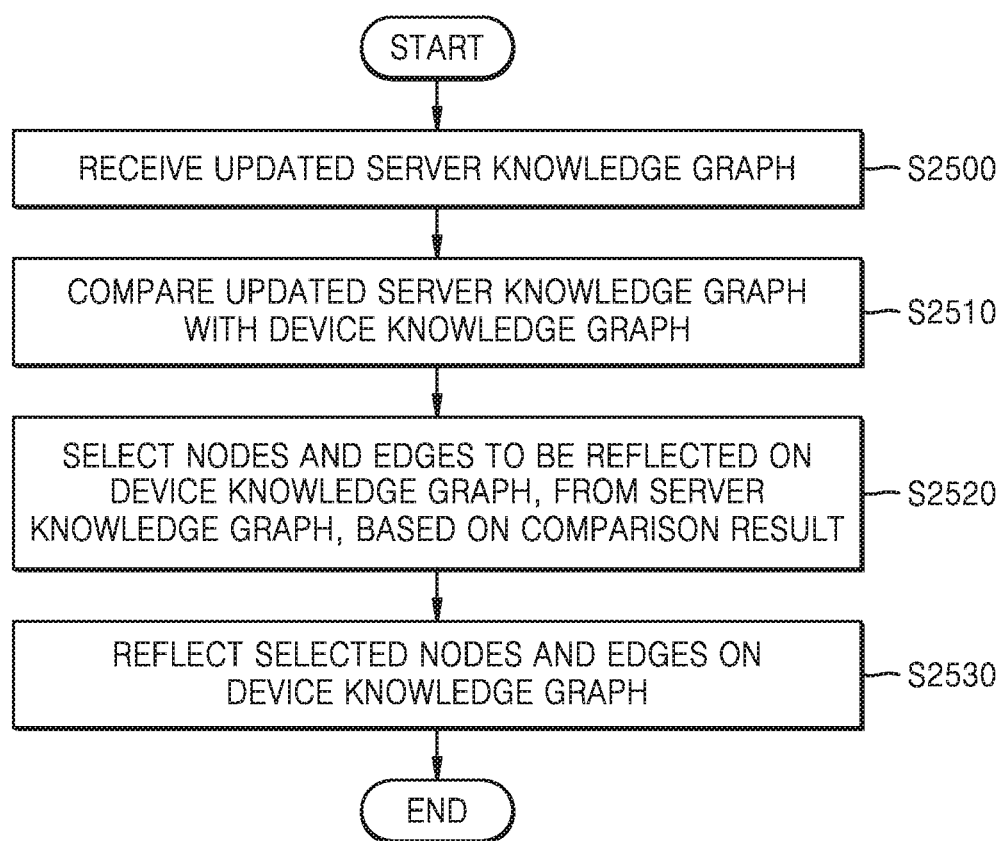
FIG. 19 is a flowchart of a method, performed by a device, of extending a device knowledge graph by using a part of a server knowledge graph, according to an embodiment.

FIG. 19 is a flowchart of a method, performed by the device 1000, of extending a device knowledge graph by using a part of a server knowledge graph, according to an embodiment.

Figure 20:
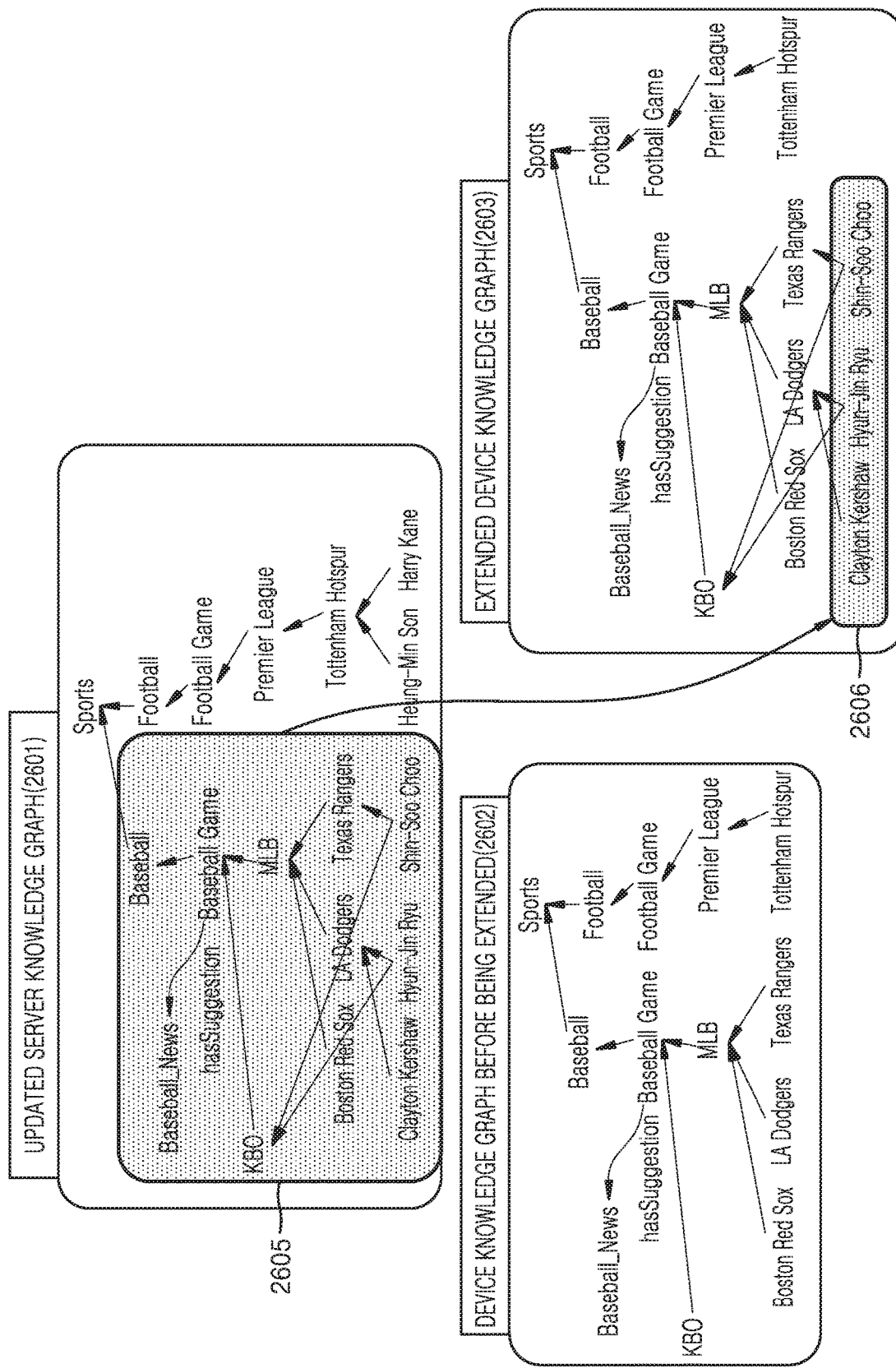
FIG. 20 is a diagram showing an example in which a device extends a device knowledge graph by using an updated server knowledge graph, according to an embodiment.

In operation S2500, the device 1000 may receive an updated server knowledge graph from the server 2000. When the server 2000 updates a part of the server knowledge graph, the device 1000 may receive the updated part of the server knowledge graph from the server 2000. For example, when some knowledge is added to or is modified in the server knowledge graph, the device 1000 may receive a part of the server knowledge graph, which is configured as knowledge triples including the added or modified some knowledge. For example, referring to FIG. 20, when a server knowledge graph 2601 is updated, the server 2000 may provide a part 2605 of the updated server knowledge graph 2601 to the device 1000.

In operation S2510, the device 1000 may compare the received updated server knowledge graph with a device knowledge graph. The device 1000 may compare nodes and edges included in the updated server knowledge graph with nodes and edges in the device knowledge graph. For example, the device 1000 may determine whether the nodes and edges included in the updated server knowledge graph are the same as the nodes and edges in the device knowledge graph, based on similarity of names of concepts, similarity of instances, and similarity of structures. For example, referring to FIG. 20, the device 1000 may identify that nodes other than Clayton Kershaw, Hyun-Jin Ryu, and Shin-Soo Choo nodes 2606 from among the nodes included in the part 2605 of the updated server knowledge graph 2601 are present in a device knowledge graph 2602, by comparing the part 2605 of the updated server knowledge graph 2601 with the device knowledge graph 2602.

In operation S2520, the device 1000 may select nodes and edges to be reflected on the device knowledge graph, from the updated server knowledge graph, based on the comparison result. The device 1000 may select nodes and edges different from the nodes and edges in the device knowledge graph, from among the nodes and edges included in the updated server knowledge graph. For example, referring to FIG. 20, the device 1000 may identify that the Clayton Kershaw, Hyun-Jin Ryu, and Shin-Soo Choo nodes 2606 included in the part 2605 of the updated server knowledge graph 2601 are not present in the device knowledge graph 2602. The device 1000 may determine to connect the Clayton Kershaw node to an LA Dodgers node, connect the Hyun-Jin Ryu node to a KBO node and the LA Dodgers node, and connect the Shin-Soo Choo node to the KBO node and a Texas Rangers node in an extended device knowledge graph 2603.

In operation S2530, the device 1000 may reflect the selected nodes and edges on the device knowledge graph. The device 1000 may identify nodes in the device knowledge graph to which the selected nodes are to be connected, and connect the selected nodes to the nodes in the device knowledge graph. Alternatively, the device 1000 may replace the nodes and edges in the device knowledge graph with the selected nodes and edges.

Figure 21:
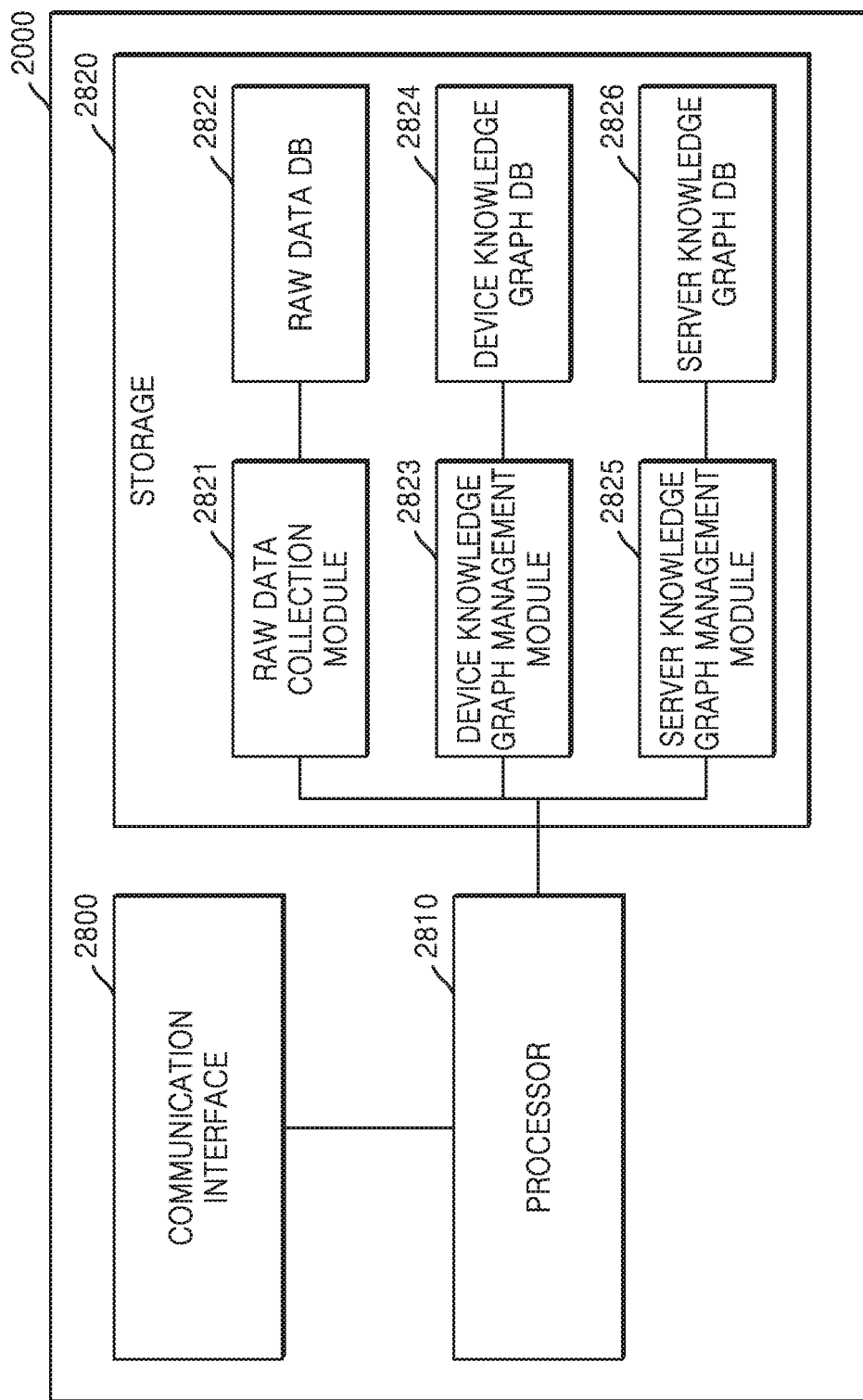
FIG. 21 is a block diagram of a server according to an embodiment.

FIG. 21 is a block diagram of the server 2000 according to an embodiment.

As illustrated in FIG. 21, the server 2000 according to an embodiment may include a communication interface 2800, a processor 2810, and a storage 2820. The storage 2820 may include a raw data collection module 2821, a raw data DB 2822, a device knowledge graph management module 2823, a device knowledge graph DB 2824, a server knowledge graph management module 2825, and a server knowledge graph DB 2826.

The communication interface 2800 may include one or more elements for communicating with the device 1000 and another server through a network. For example, the communication interface 2800 may include a hardware interface for communication through a wired network such as a local area network (LAN), a wide area network (WAN), or a value added network (VAN), or a wireless network such as a mobile radio communication network or a satellite communication network. The communication interface 2800 may transmit or receive information required to generate and update a server knowledge graph, to or from the device 1000 and the other server.

The storage 2820 may store data for processing and control operations of the processor 2810. The storage 2820 may include at least one type of storage medium from among flash memory, a hard disk, a multimedia card micro, a memory card (e.g., a secure digital (SD) or extreme digital (XD) memory card), random access memory (RAM), static RAM (SRAM), read-only memory (ROM), electrically erasable programmable ROM (EEPROM), programmable ROM (PROM), magnetic memory, a magnetic disc, or an optical disc.

Programs or data stored in the storage 2820 may be classified into a plurality of modules, e.g., the raw data collection module 2821, the raw data DB 2822, the device knowledge graph management module 2823, the device knowledge graph DB 2824, the server knowledge graph management module 2825, and the server knowledge graph DB 2826, according to functions thereof.

The processor 2810 controls overall operations of the server 2000. The processor 2810 may control the communication interface 1500 and the storage 2820 by executing the programs stored in the storage 2820. The processor 2810 may perform the functions of the server 2000 described above in relation to FIGS. 1 to 25, by using the raw data collection module 2821, the raw data DB 2822, the device knowledge graph management module 2823, the device knowledge graph DB 2824, the server knowledge graph management module 2825, and the server knowledge graph DB 2826.

Figure 22:
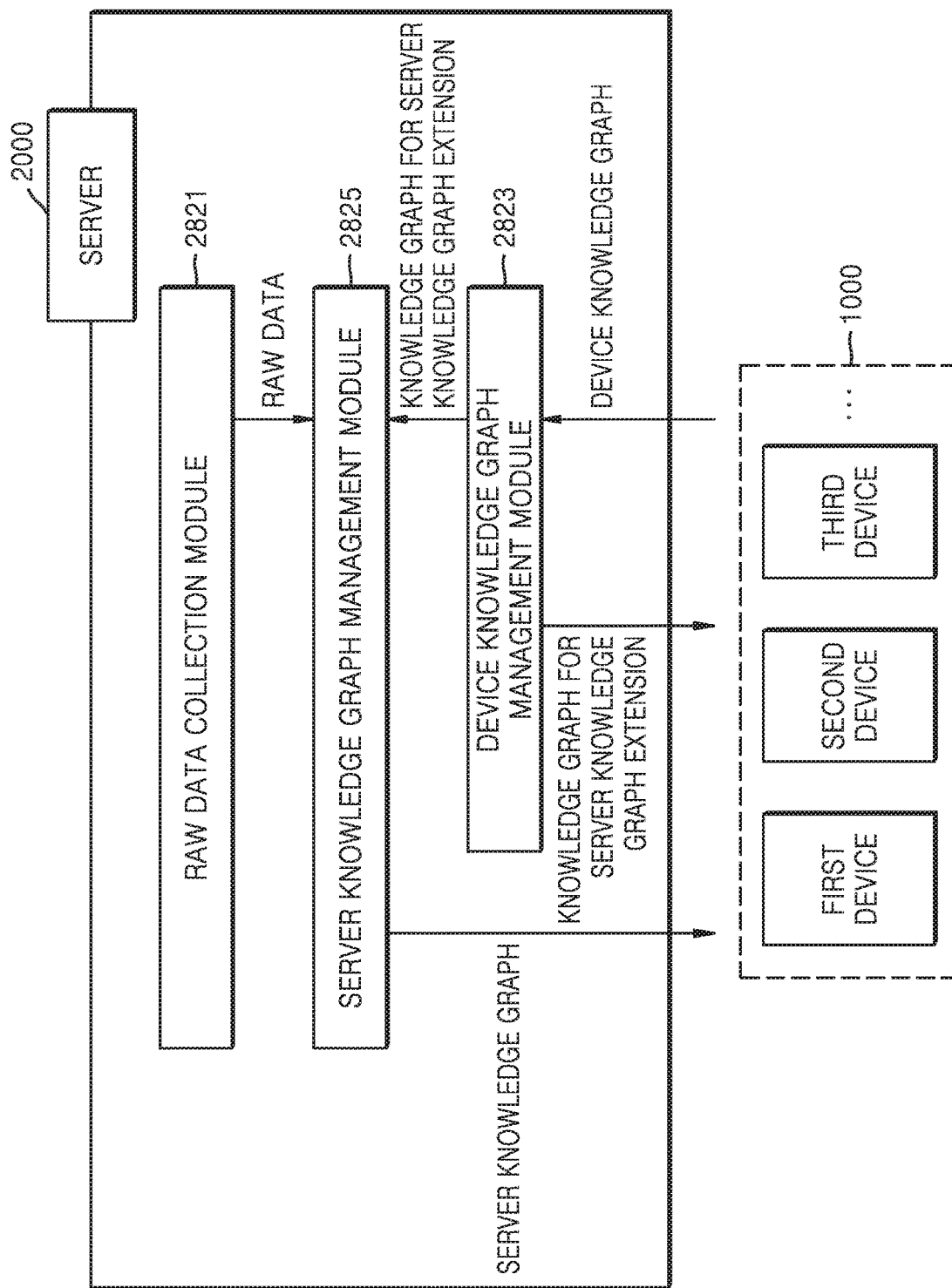
FIG. 22 is a block diagram for describing operations of software modules in a server, according to an embodiment.

FIG. 22 is a block diagram for describing operations of software modules in the server 2000, according to an embodiment.

The software modules illustrated in FIG. 22 may be executed by the processor 2810 to perform functions thereof. Referring to FIG. 22, the raw data collection module 2821 may collect raw data for generating a server knowledge graph, and store the collected raw data in the raw data DB 2822. The raw data collection module 2821 may provide the collected raw data to the server knowledge graph management module 2825.

The server knowledge graph management module 2825 may generate, update, and manage a server knowledge graph. The server knowledge graph management module 2825 may generate knowledge triples to be included in the server knowledge graph, by analyzing the raw data provided from the raw data collection module 2821, and generate the server knowledge graph by connecting the generated knowledge triples. The server knowledge graph management module 2825 may receive a knowledge graph for server knowledge graph extension from the device knowledge graph management module 2823, and update the server knowledge graph by using the received knowledge graph for server knowledge graph extension. The server knowledge graph management module 2825 may provide at least a part of the server knowledge graph to the devices 1000. The server knowledge graph management module 2825 may store the generated server knowledge graph and the updated server knowledge graph in the server knowledge graph DB 2826.

The device knowledge graph management module 2823 may manage device knowledge graphs received from the devices 1000. The device knowledge graph management module 2823 may generate the knowledge graph for server knowledge graph extension by comparing the device knowledge graphs received from a plurality of devices 1000. The device knowledge graph management module 2823 may provide the knowledge graph for server knowledge graph extension to the devices 1000. The device knowledge graph management module 2823 may store the knowledge graph for server knowledge graph extension and the device knowledge graphs in the device knowledge graph DB 2824.

Figure 23:
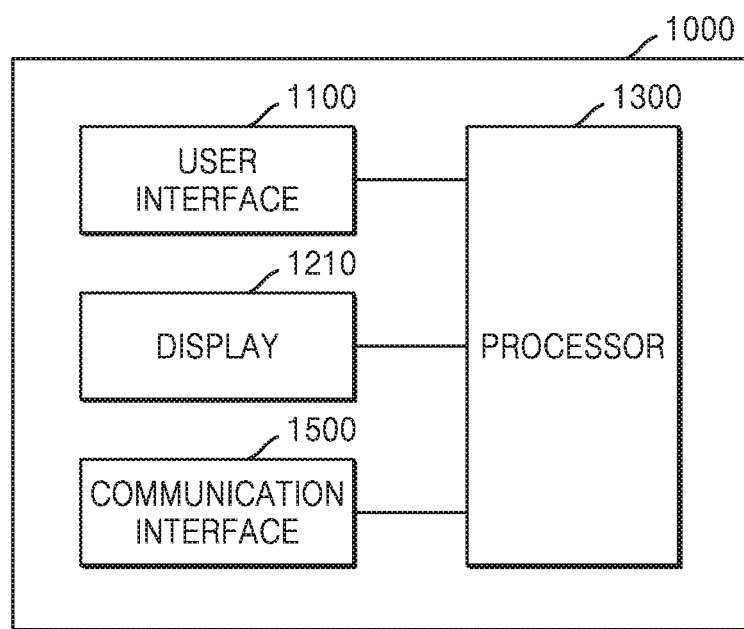
FIG. 23 is a block diagram of a device according to an embodiment.
Figure 24:
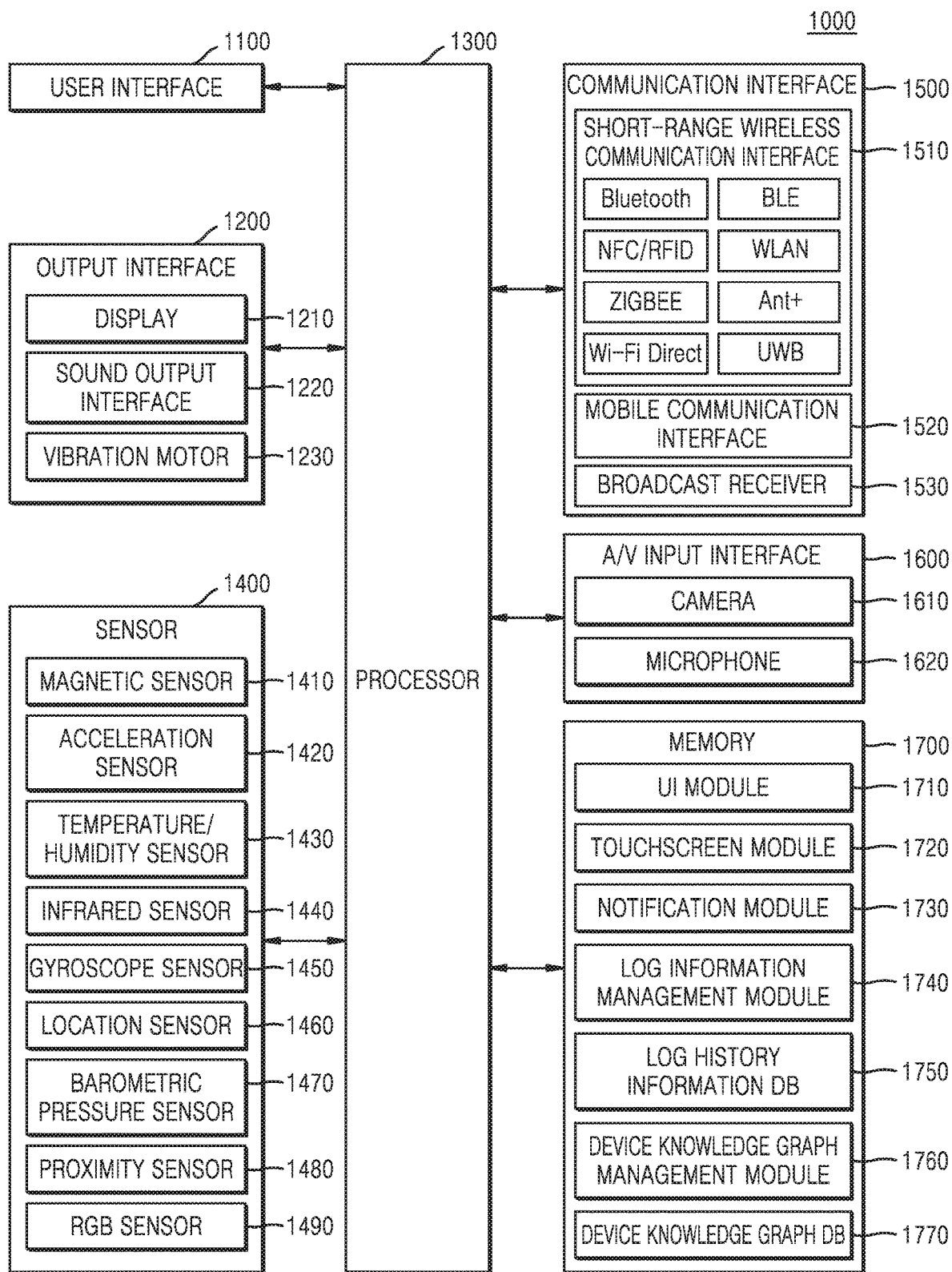
FIG. 24 is a detailed block diagram of a device according to an embodiment.

FIGS. 23 and 24 are block diagrams of the device 1000 according to embodiments.

As illustrated in FIG. 23, the device 1000 according to an embodiment may include a user interface 1100, a display 1210, a communication interface 1500, and a processor 1300. However, not all elements illustrated in FIG. 23 are essential elements of the device 1000. The device 1000 may include a larger or smaller number of elements compared to those illustrated in FIG. 23. For example, FIG. 24 is a detailed block diagram of the device 1000 according to an embodiment.

As illustrated in FIG. 24, in addition to the user interface 1100, the display 1210, the communication interface 1500, and the processor 1300, the device 1000 according to an embodiment may further include a sensor 1400, an audio/video (A/V) input interface 1600, and a memory 1700.

The user interface 1100 refers to a device used by a user to input data for controlling the device 1000. For example, the user interface 1100 may include a keypad, a touchpad, a jog wheel, or a jog switch, but is not limited thereto. The user interface 1100 may receive a user input related to an operation of the device 1000 for a device knowledge graph.

An output interface 1200 may output an audio signal, a video signal, or a vibration signal, and may include the display 1210, a sound output interface 1220, and a vibration motor 1230.

The display 1210 displays information processed by the device 1000. When the display 1210 and a touchpad are layered to configure a touchscreen, the display 1210 may be used not only as an output device but also as an input device.

The sound output interface 1220 outputs audio data received from the communication interface 1500 or stored in the memory 1700. The vibration motor 1230 may output a vibration signal.

The sensor 1400 may detect a status of the device 1000 or a status of an ambient environment of the device 1000, and transmit the detected information to the processor 1300. The sensor 1400 may include any one or any combination of a magnetic sensor 1410, an acceleration sensor 1420, a temperature/humidity sensor 1430, an infrared sensor 1440, a gyroscope sensor 1450, a location sensor 1460 (e.g., a global positioning system (GPS)), a barometric pressure sensor 1470, a proximity sensor 1480, or an RGB (or illuminance) sensor 1490, but is not limited thereto.

The communication interface 1500 may include one or more elements for communicating with the server 2000, another server, and another device. For example, the communication interface 1500 may include a short-range wireless communication interface 1510, a mobile communication interface 1520, and a broadcast receiver 1530.

The short-range wireless communication interface 1510 may include a Bluetooth communication interface, a Bluetooth low energy (BLE) communication interface, a near-field communication (NFC) communication interface, a wireless local area network (WLAN) (or Wi-Fi) communication interface, a Zigbee communication interface, an infrared data association (IrDA) communication interface, a Wi-Fi direct (WFD) communication interface, a ultra-wideband (UWB) communication interface, or an Ant+ communication interface, but is not limited thereto. The mobile communication interface 1520 transmits and receives wireless signals to and from any one or any combination of a base station, an external device, or a server in a mobile communication network. Herein, the wireless signals may include various types of data based on transmission and reception of voice call signals, video call signals, or text/multimedia messages. The broadcast receiver 1530 receives broadcast signals and/or broadcast information through broadcast channels from outside. The broadcast channels may include satellite channels and terrestrial channels.

The communication interface 1500 may transmit and receive data for generating, updating, and managing a device knowledge graph, to and from the server 2000, the other server, and the other device.

The A/V input interface 1600 is used to input audio signals or video signals, and may include, for example, a camera 1610 and a microphone 1620. The camera 1610 may obtain image frames such as still images or moving images by using an image sensor in a video call mode or a camera mode. The microphone 1620 may receive an external sound signal and process the same into electrical voice data. For example, the microphone 1620 may receive the sound signal from an external device or a user.

The memory 1700 may store programs for processing and control operations of the processor 1300, and store data input to or to be output from the device 1000. The memory 1700 may include at least one type of storage medium from among flash memory, a hard disk, a multimedia card micro, a memory card (e.g., a secure digital (SD) or extreme digital (XD) memory card), random access memory (RAM), static RAM (SRAM), read-only memory (ROM), electrically erasable programmable ROM (EEPROM), programmable ROM (PROM), magnetic memory, a magnetic disc, or an optical disc.

The programs stored in the memory 1700 may be classified into a plurality of modules, e.g., a user interface (UI) module 1710, a touchscreen module 1720, a notification module 1730, a log information management module 1740, a log history information DB 1750, a device knowledge graph management module 1760, and a device knowledge graph DB 1770, according to functions thereof. The programs stored in the memory 1700 may be executed by the processor 1300 to perform functions thereof.

The UI module 1710 may provide a specialized UI or graphic user interface (GUI) connected to the device 1000, per application. The touchscreen module 1720 may detect a touch gesture of the user on a touchscreen, and transmit information on the touch gesture to the processor 1300. The touchscreen module 1720 may be configured as separate hardware including a controller. The notification module 1730 may generate a signal to notify that an event of the device 1000 has occurred.

The log information management module 1740 may collect and manage log information for generating a device knowledge graph. The log information management module 1740 may collect the log information from the user interface 1100, the output interface 1200, the sensor 1400, the communication interface 1500, and the A/V input interface 1600, and manage the log information. The log history information DB 1750 may accumulatively store the collected log information. The device knowledge graph management module 1760 may generate, update, and manage a device knowledge graph. The device knowledge graph DB 1770 may store the device knowledge graph.

The processor 1300 controls overall operations of the device 1000. For example, the processor 1300 may control the user interface 1100, the output interface 1200, the sensor 1400, the communication interface 1500, and the A/V input interface 1600 by executing the programs stored in the memory 1700.

The processor 1300 may perform the functions of the device 1000 described above in relation to FIGS. 1 to 25, by using the log information management module 1740, the log history information DB 1750, the device knowledge graph management module 1760, and the device knowledge graph DB 1770.

Figure 25:
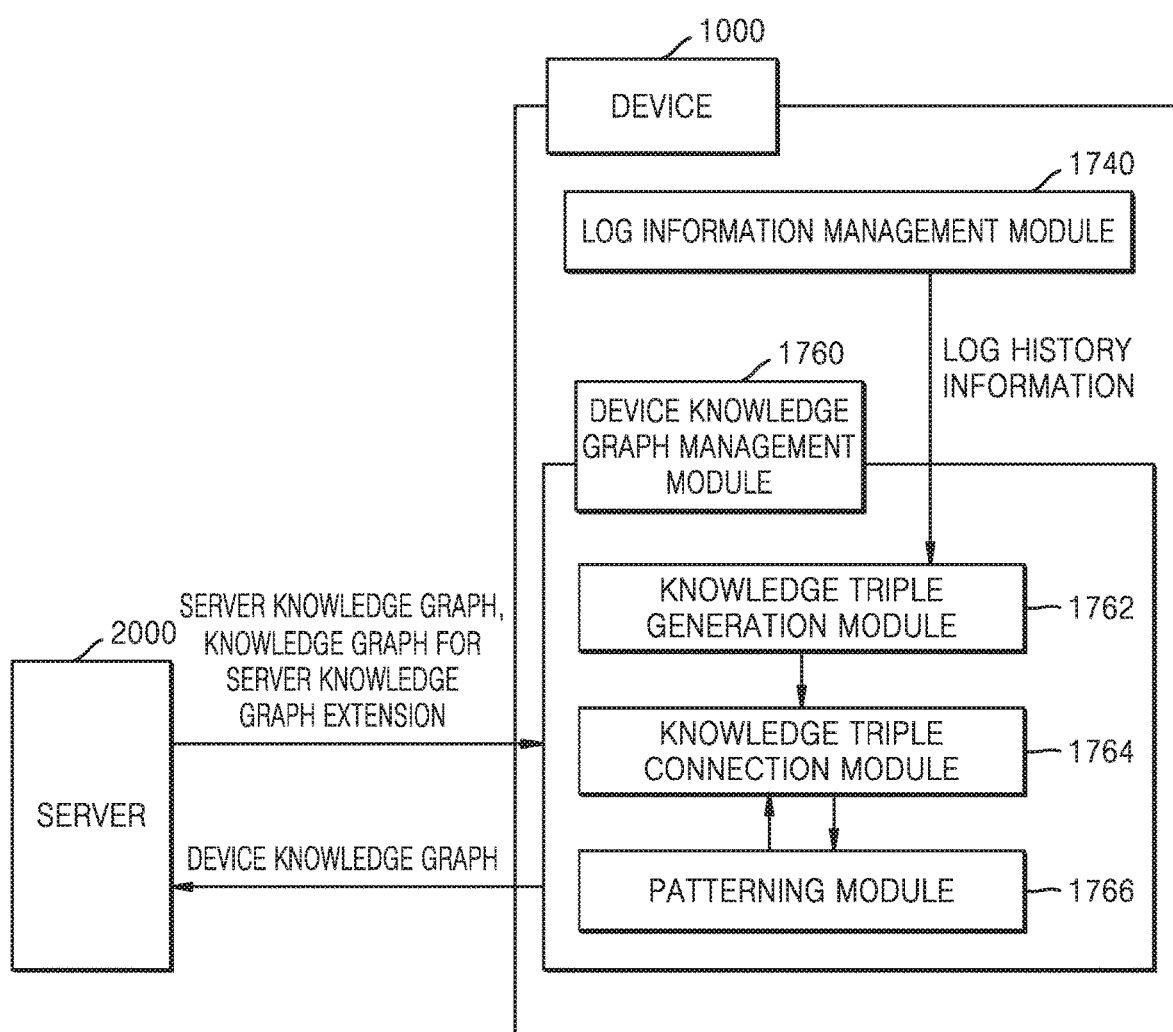
FIG. 25 is a block diagram for describing operations of software modules in a device, according to an embodiment.

FIG. 25 is a block diagram for describing operations of software modules in the device 1000, according to an embodiment.

The software modules illustrated in FIG. 25 may be executed by the processor 1300 to perform functions thereof. Referring to FIG. 25, the log information management module 1740 may collect log history information related to operations executed in the device 1000, and provide the collected log history information to a knowledge triple generation module 1762.

The knowledge triple generation module 1762 may process the collected log history information into data usable to generate a device knowledge graph. The knowledge triple generation module 1762 may generate knowledge triples representing a series of sequential operations executed in the device 1000, by converting the collected log history information into knowledge. The knowledge triple generation module 1762 may provide the generated knowledge triples to a knowledge triple connection module 1764.

The knowledge triple connection module 1764 may generate a device knowledge graph by connecting the knowledge triples representing the operations executed in the device 1000. The device 1000 may compare nodes and edges for configuring the knowledge triples, to assign roles to the nodes, and connect the nodes to each other, based on relations between the nodes.

The knowledge triple connection module 1764 may receive a server knowledge graph or a knowledge graph for server knowledge graph extension from the server 2000. The knowledge triple connection module 1764 may extend the device knowledge graph by connecting the knowledge triples to the received server knowledge graph or knowledge graph for server knowledge graph extension.

A patterning module 1766 may receive the connected knowledge triples from the knowledge triple connection module 1764, and generate knowledge triples representing an operation pattern of the device 1000, based on the received knowledge triples. The patterning module 1766 may identify that the device 1000 repeats an operation (e.g., watching YouTube videos related to a baseball) in a situation (e.g., booking a baseball game) a number of times greater than or equal to a threshold, by analyzing which operation is executed in which situation by the device 1000, based on the received knowledge triples. The patterning module 1766 may generate the knowledge triples representing the operation pattern of the device 1000, by connecting a node representing the situation (e.g., booking a baseball game) to a node representing the operation (e.g., watching YouTube videos related to a baseball). In addition, the patterning module 1766 may provide the knowledge triples representing the operation pattern of the device 1000, to the knowledge triple connection module 1764. In this case, the knowledge triple connection module 1764 may generate or update the device knowledge graph by using the knowledge triples representing the operation pattern of the device 1000.

T the patterning module 1766 may provide the device knowledge graph including the knowledge triples representing the operation pattern of the device 1000, to the server 2000.

The device knowledge graph management module 1760 may detect matching concepts from raw data or knowledge triples, based on a probabilistic matching model, a distance-based model, declarative matching rules and constraints, or the like. The device 1000 may perform knowledge refinement on the detected concepts. For example, the device 1000 may refine the detected concepts by using knowledge fusion, error detection, fact inference, or the like. Through the above-described procedure, the device 1000 may generate and update a device knowledge graph by obtaining knowledge triples related to generation of a knowledge graph, and structuralizing and connecting the obtained knowledge triples.

Embodiments of the disclosure may be implemented in the form of a computer-readable recording medium including instructions executable by a computer, e.g., a program module executed by the computer. The computer-readable recording medium may be an arbitrary available medium accessible by the computer, and examples thereof include all of volatile, non-volatile, detachable, and non-detachable media. The computer-readable recording medium may include a computer storage medium and a communication medium. Examples of the computer storage medium include all of volatile, non-volatile, detachable, and non-detachable media implemented using an arbitrary method or technology for storing information such as computer-readable instructions, data structures, program modules, or other data. The communication medium may include computer-readable instructions, data structures, program modules, or other data in modulated data signals.

As used herein, the term "unit" may indicate a hardware component such as a processor or a circuit, and/or a software component executed by the hardware component such as the processor.

The expression "at least one of a, b or c" indicates only a, only b, only c, both a and b, both b and c, both a and c, or all of a, b, and c.

The above descriptions of the disclosure are provided for the purpose of illustration, and it will be understood by one of ordinary skill in the art that various changes in form and details may be made therein without departing from the scope of the disclosure. Therefore, it may be understood that embodiments of the disclosure described herein may be considered in a descriptive sense only and not for purposes of limitation. For example, each component described to be of a single type can be implemented in a distributed manner and, likewise, components described as being distributed can be implemented in a combined manner.

The scope of the disclosure is defined by the following claims rather than by the detailed description, and it may be understood that all modifications from the claims and their equivalents are included in the scope of the disclosure.

What is claimed is:

1. A method of updating a server knowledge graph, the method being performed by a server and comprising:

obtaining a server knowledge graph of the server;

obtaining a plurality of device knowledge graphs by receiving a device knowledge graph from each of a plurality of devices, the device knowledge graph including nodes corresponding to concepts, determined from raw data or knowledge triples by using at least one of a probabilistic matching model, a distance-based model, or declarative matching rules and constraints, and edges representing relationships between the concepts, wherein the nodes and the edges of the device knowledge graph of a device represent a series of operations that are executed in the device;

generating a knowledge graph for server knowledge graph extension, based on comparison between nodes and edges in the obtained plurality of device knowledge graphs; and updating the obtained server knowledge graph, using the generated knowledge graph for server knowledge graph extension.

2. The method of claim 1, wherein the generating of the knowledge graph for server knowledge graph extension further comprises:

selecting some of the nodes and edges in the plurality of device knowledge graphs, based on the compared nodes and edges; and generating the knowledge graph for server knowledge graph extension by connecting the selected some of the nodes and edges.

3. The method of claim 2, wherein the selecting of the some of the nodes and edges in the plurality of device knowledge graphs comprises selecting repeated nodes and edges from among the compared nodes and edges in the plurality of device knowledge graphs.

4. The method of claim 3, wherein the selecting of the some of the nodes and edges in the plurality of device knowledge graphs comprises selecting the repeated nodes and edges from among the compared nodes and edges in the plurality of device knowledge graphs, based on weights for the plurality of devices.

5. The method of claim 1, wherein the device knowledge graph is generated by each of the plurality of devices, based on log information related to a device operation history that is collected by a respective one of the plurality of devices, and the device knowledge graph comprises information of operations that are executed in the respective one of the plurality of devices, and of situations when the operations are executed.

6. The method of claim 5, wherein values corresponding to nodes and edges in the device knowledge graph are abstracted to represent a series of operations that are repeatedly executed in the respective one of the plurality of devices for a number of times greater than or equal to a threshold.

7. The method of claim 5, wherein the knowledge graph for server knowledge graph extension represents the series of operations that are executed in the plurality of devices.

8. The method of claim 1, wherein the updating of the obtained server knowledge graph comprises extending the obtained server knowledge graph by connecting any one or any combination of first nodes in the generated knowledge graph for server knowledge graph extension to any one or any combination of second nodes in the obtained server knowledge graph.

9. The method of claim 8, further comprising determining the any one or any combination of the first nodes connected to the any one or any combination of the second nodes, based on any one or any combination of similarities of names of the first nodes and the second nodes, similarities of instances related to the first nodes and the second nodes, and similarities of structures of knowledge graphs.

10. The method of claim 1, further comprising providing the generated knowledge graph for server knowledge graph extension to a device other than the plurality of devices,
wherein the provided knowledge graph for server knowledge graph extension is used by the other device to update a device knowledge graph of the other device.

11. The method of claim 1, further comprising providing the updated server knowledge graph to any one or any combination of the plurality of devices,
wherein the provided server knowledge graph is used by the any one or any combination of the plurality of devices to update the device knowledge graph of the any one or any combination of the plurality of devices.

12. A server for updating a server knowledge graph, the server comprising:
a storage storing at least one instruction; and
a processor configured to execute the at least one instruction to:
obtain a server knowledge graph of the server;
obtain a plurality of device knowledge graphs by receiving a device knowledge graph from each of a plurality of devices, the device knowledge graph including nodes corresponding to concepts, determined from raw data or knowledge triples by using at least one of a probabilistic matching model, a distance-based model, or declarative matching rules and constraints, and edges representing relationships between the concepts, wherein the nodes and the edges of the device knowledge graph of a device represent a series of operations that are executed in the device;
generate a knowledge graph for server knowledge graph extension, based on comparison between nodes and edges in the obtained plurality of device knowledge graphs; and
update the obtained server knowledge graph, using the generated knowledge graph for server knowledge graph extension.

13. The server of claim 12, wherein the processor is further configured to execute the at least one instruction to:
select some of the nodes and edges in the plurality of device knowledge graphs, based on the compared nodes and edges; and
generate the knowledge graph for server knowledge graph extension by connecting the selected some of the nodes and edges.

14. The server of claim 13, wherein the processor is further configured to execute the at least one instruction to select repeated nodes and edges from among the compared nodes and edges in the plurality of device knowledge graphs.

15. The server of claim 14, wherein the processor is further configured to execute the at least one instruction to select the repeated nodes and edges from among the compared nodes and edges in the plurality of device knowledge graphs, based on weights for the plurality of devices.

16. The server of claim 12, wherein the device knowledge graph is generated by each of the plurality of devices, based on log information related to a device operation history that is collected by a respective one of the plurality of devices, and
the device knowledge graph comprises information of operations that are executed in the respective one of the plurality of devices, and of situations when the operations are executed.

17. The server of claim 16, wherein values corresponding to nodes and edges in the device knowledge graph are abstracted to represent a series of operations that are repeatedly executed in the respective one of the plurality of devices for a number of times greater than or equal to a threshold.

18. The server of claim 16, wherein the knowledge graph for server knowledge graph extension represents the series of operations that are executed in the plurality of devices.

19. The server of claim 12, wherein the processor is further configured to execute the at least one instruction to extend the obtained server knowledge graph by connecting any one or any combination of first nodes in the generated knowledge graph for server knowledge graph extension to any one or any combination of second nodes in the obtained server knowledge graph.

20. The server of claim 12, wherein the processor is further configured to execute the at least one instruction to provide the generated knowledge graph for server knowledge graph extension to a device other than the plurality of devices, and
wherein the provided knowledge graph for server knowledge graph extension is used by the other device to update a device knowledge graph of the other device.

* * * * *